(12) United States Patent
Umezawa et al.

(10) Patent No.: US 9,544,453 B2
(45) Date of Patent: Jan. 10, 2017

(54) IMAGE PROCESSING APPARATUS, IMAGE PROCESSING METHOD, AND COMPUTER PROGRAM PRODUCT

(75) Inventors: Asaki Umezawa, Tokyo (JP); Mikane Tago, Kanagawa (JP); Hiroshi Yamaguchi, Kanagawa (JP); Daisuke Taniuchi, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 699 days.

(21) Appl. No.: 13/605,330

(22) Filed: Sep. 6, 2012

(65) Prior Publication Data

US 2013/0074008 A1 Mar. 21, 2013

(30) Foreign Application Priority Data

Sep. 16, 2011 (JP) .................................. 2011-203057

(51) Int. Cl.
*H04N 1/00* (2006.01)
*G03G 15/00* (2006.01)

(52) U.S. Cl.
CPC ........ *H04N 1/00413* (2013.01); *G03G 15/502* (2013.01); *H04N 1/0097* (2013.01);
(Continued)

(58) Field of Classification Search
CPC .. G06F 3/0481; G06F 3/0238; G06F 3/04842; H04N 1/00389; H04N 1/00411; H04N 1/00413; H04N 1/00474; H04N 1/00514; H04N 1/4406; H04N 2201/0094
(Continued)

(56) References Cited

U.S. PATENT DOCUMENTS 6,785,487 B2 * 8/2004 Maeda et al. ................... 399/81
8,086,687 B2 12/2011 Matoba
(Continued)

FOREIGN PATENT DOCUMENTS

CN 101282398 A 10/2008
CN 101738919 A 6/2010
(Continued)

OTHER PUBLICATIONS

Combined Office Action and Search Report issued Jul. 24, 2014, in Chinese Patent Application No. 201210337323.0 with English translation.
(Continued)

*Primary Examiner* — Sherrod Keaton
(74) *Attorney, Agent, or Firm* — Oblon, McClelland, Maier & Neustadt, L.L.P.

(57) ABSTRACT

An image processing apparatus having functions includes an image processing unit that executes the functions; a memory that stores a function table including function identification information identifying the functions, initial values preset for the functions, and registered values set for the functions by a user, in a corresponding manner to each other; a display processing unit that displays a function list screen on which initial value buttons for calling up an initial value function screen accepting an input of an instruction from the user to execute the function using the initial values, and first registered value buttons for calling up a registered value function screen accepting an input of the instruction from the user to execute the function using the registered values are arranged; and an accepting unit accepting a selection of the initial value button or the first registered value button on the function list screen from the user.

14 Claims, 45 Drawing Sheets

(52) U.S. Cl.
CPC ..... *H04N 1/00474* (2013.01); *H04N 1/00503* (2013.01); *H04N 2201/0094* (2013.01)

(58) Field of Classification Search
USPC ........................................................ 715/810
See application file for complete search history.

(56) References Cited

U.S. PATENT DOCUMENTS

| | | | |
|---|---|---|---|
| 2002/0015598 A1* | 2/2002 | Maeda | H04N 1/00352 399/81 |
| 2002/0080376 A1 | 6/2002 | Momose et al. | |
| 2006/0262338 A1 | 11/2006 | Momose et al. | |
| 2008/0068636 A1 | 3/2008 | Momose et al. | |
| 2009/0046057 A1 | 2/2009 | Umezawa | |
| 2009/0144663 A1 | 6/2009 | Shigenobu | |
| 2009/0237699 A1* | 9/2009 | Umezawa | H04N 1/32561 358/1.13 |
| 2010/0122187 A1 | 5/2010 | Kunori et al. | |
| 2010/0195153 A1 | 8/2010 | Momose et al. | |
| 2010/0271669 A1 | 10/2010 | Yamaguchi | |
| 2011/0047494 A1* | 2/2011 | Chaine | G06F 3/04883 715/769 |
| 2011/0058194 A1* | 3/2011 | Kawano | G06F 3/1205 358/1.9 |
| 2011/0265037 A1* | 10/2011 | Okuma | G06F 3/04817 715/810 |
| 2014/0022599 A1 | 1/2014 | Sugino | |

FOREIGN PATENT DOCUMENTS

| | | |
|---|---|---|
| JP | 2001-43050 A | 2/2001 |
| JP | 2001-306204 A | 11/2001 |
| JP | 2005-7579 A | 1/2005 |
| JP | 2005-74715 A | 3/2005 |
| JP | 2005-301890 | 10/2005 |
| JP | 2006-260544 A | 9/2006 |
| JP | 2006-350912 | 12/2006 |
| JP | 2007-221731 | 8/2007 |
| JP | 2007-300289 | 11/2007 |
| JP | 2009-070365 | 4/2009 |
| JP | 2009-130815 | 6/2009 |
| JP | 2009-134475 | 6/2009 |
| JP | 2009-134476 | 6/2009 |
| JP | 2009-260903 | 11/2009 |
| JP | 2010-114825 | 5/2010 |
| JP | 2011-87280 A | 4/2011 |
| JP | 2011-139393 A | 7/2011 |

OTHER PUBLICATIONS

Office Action issued Jun. 16, 2015 in Japanese Patent Application No. 2011-203057.

* cited by examiner

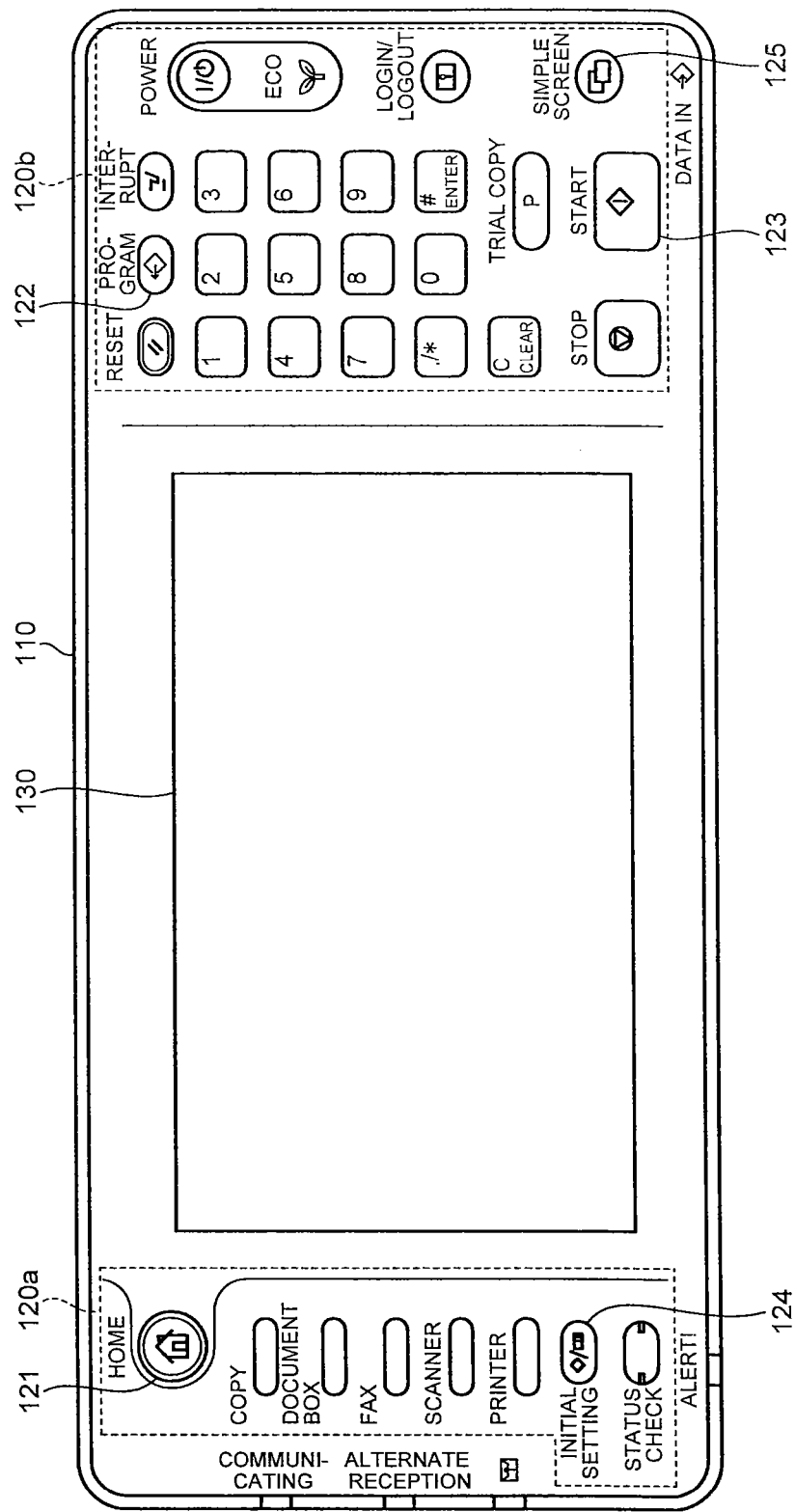

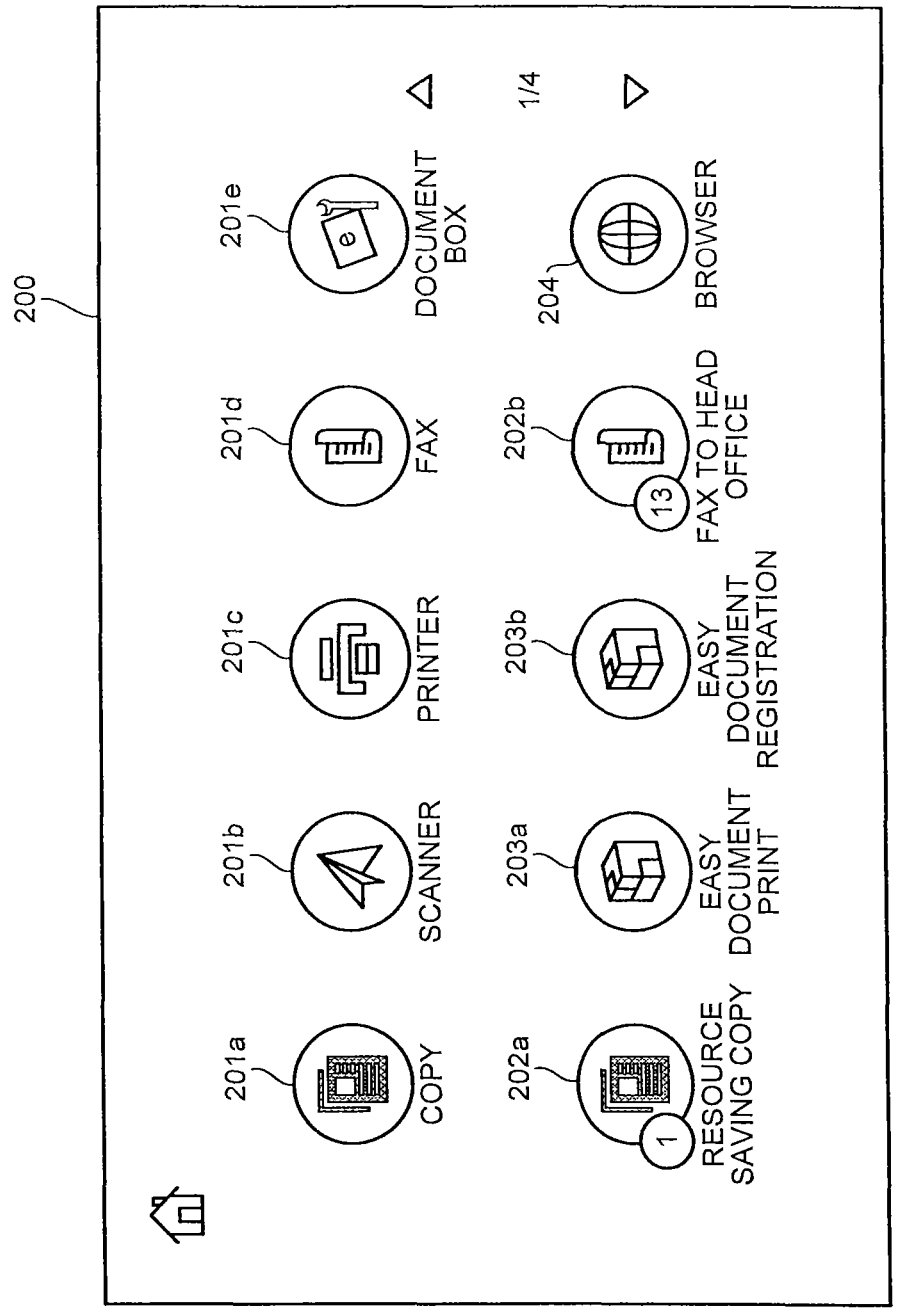

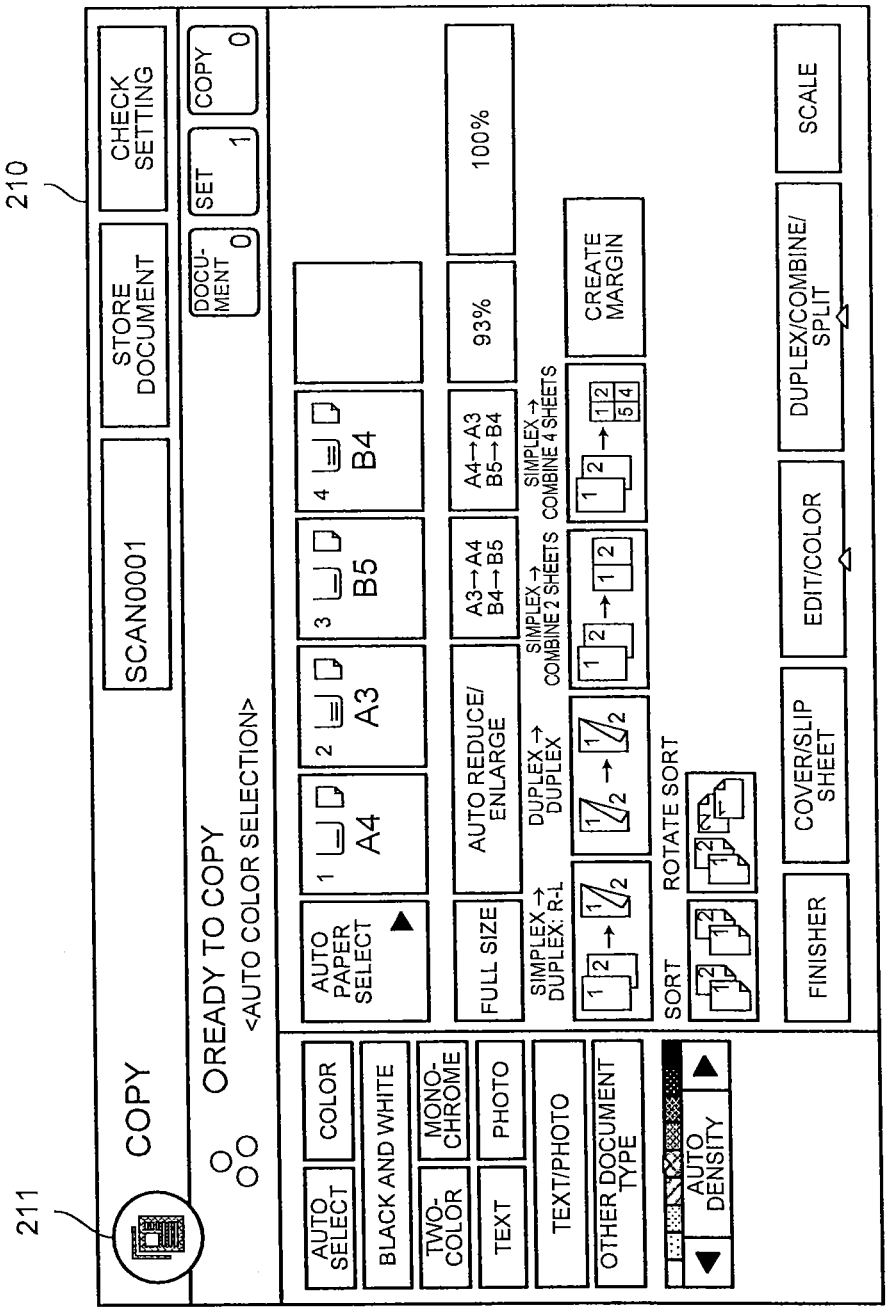

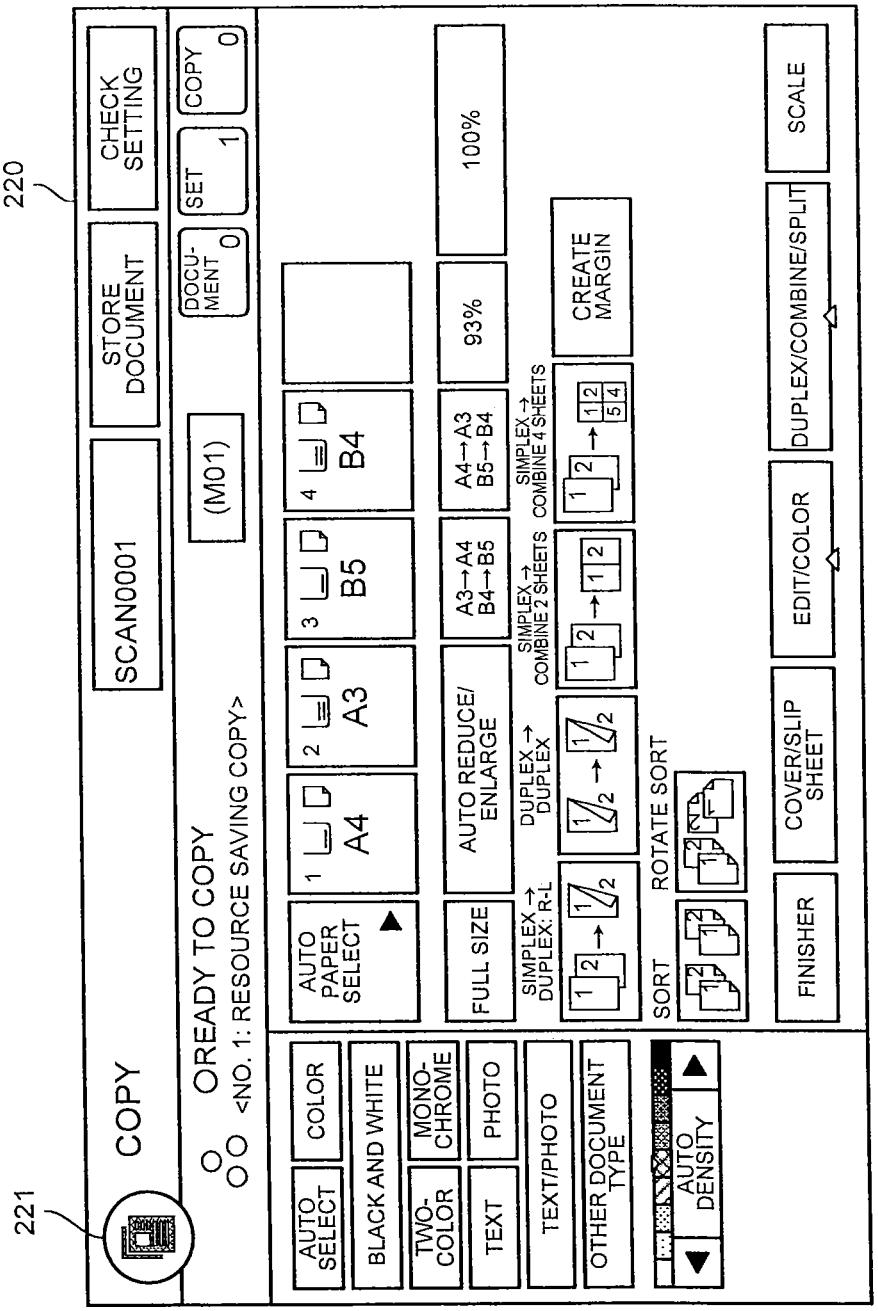

COPY                RESOURCE SAVING COPY

| FUNCTION ID | REGISTERED VALUE ID | NAME | SET VALUE | DISPLAY ON HOME SCREEN | DISPLAY POSITION |
|---|---|---|---|---|---|
| COPY | - | | INITIAL VALUE | YES | 1 |
| | 001 | RESOURCE SAVING COPY | REGISTERED VALUE 1 | YES | 5 |
| | 002 | BLACK-AND-WHITE COPY | REGISTERED VALUE 2 | NO | 6 |
| | ... | ... | ... | ... | ... |
| SCANNER | - | | INITIAL VALUE | YES | 2 |
| | ... | ... | ... | ... | ... |
| FACSIMILE | - | | INITIAL VALUE | YES | 3 |
| | 013 | FAX TO HEAD OFFICE | REGISTERED VALUE 13 | YES | 7 |
| | ... | ... | ... | ... | ... |

FIG.6
| FUNCTION ID | ICON IMAGE |
|---|---|
| COPY |  |
| SCANNER |  |
| FACSIMILE |  |
| ... | ... |

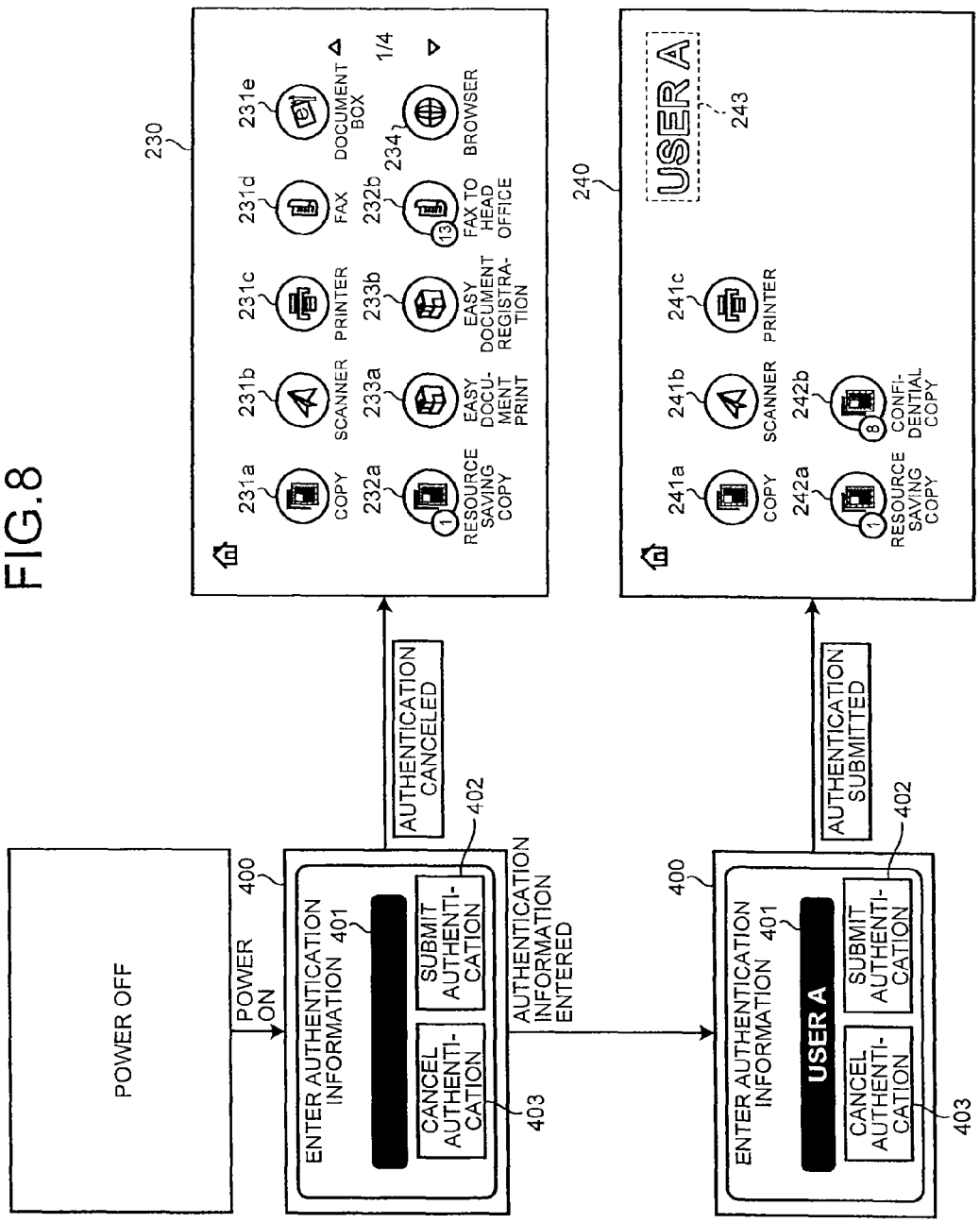

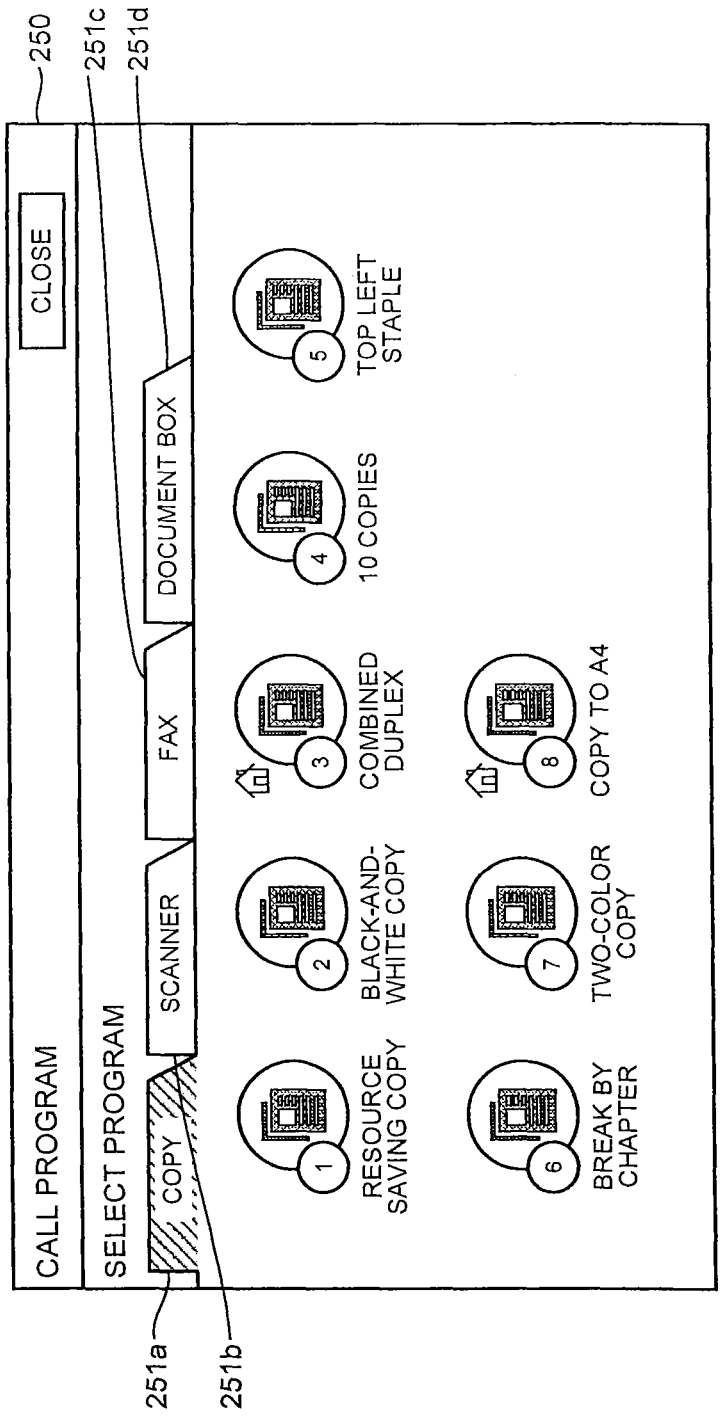

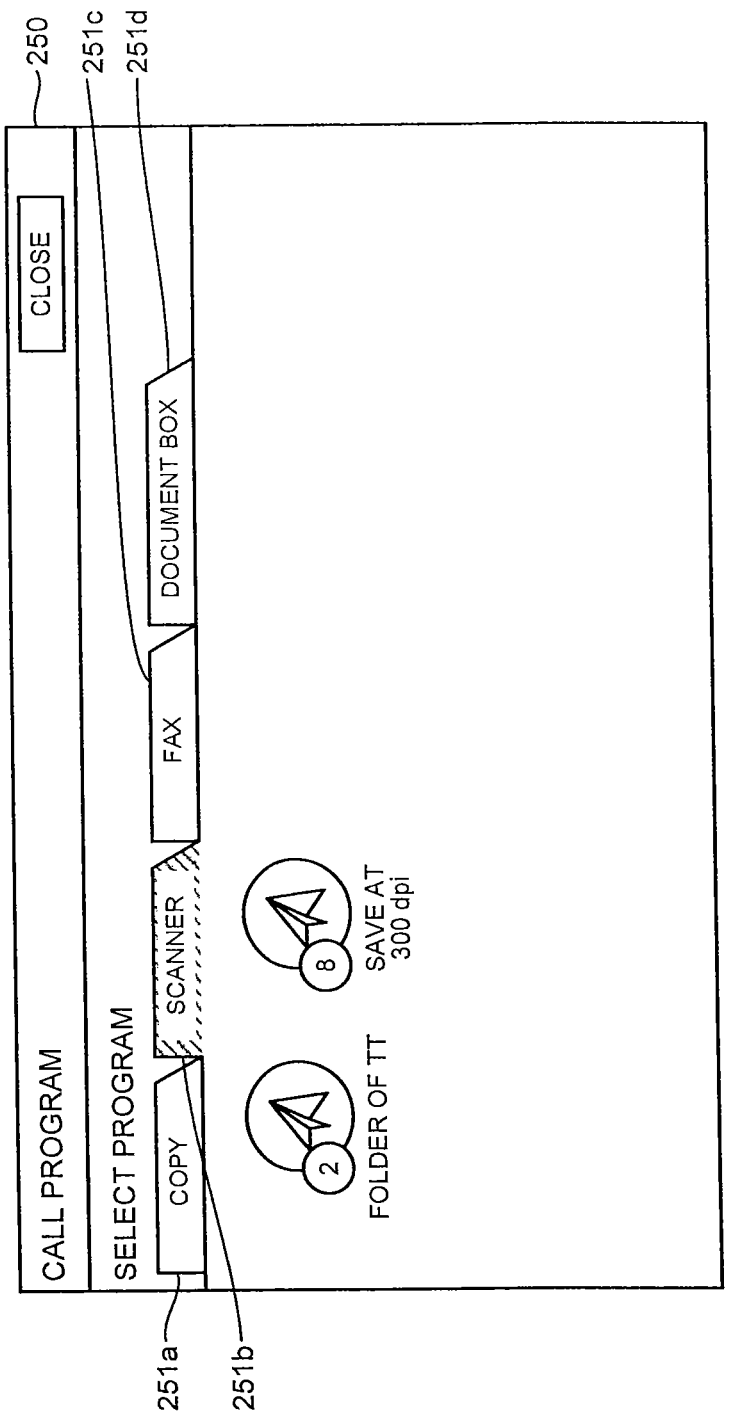

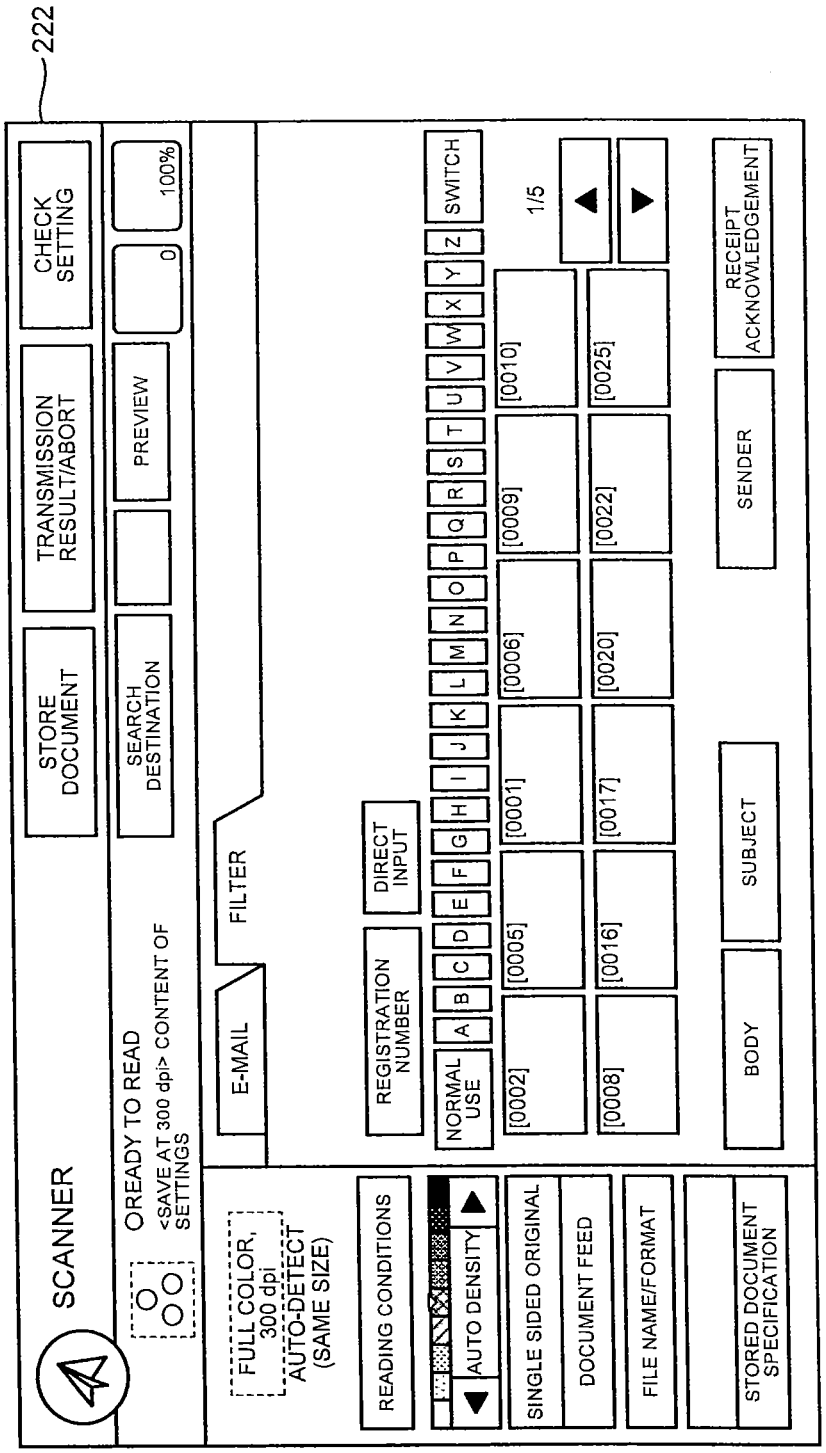

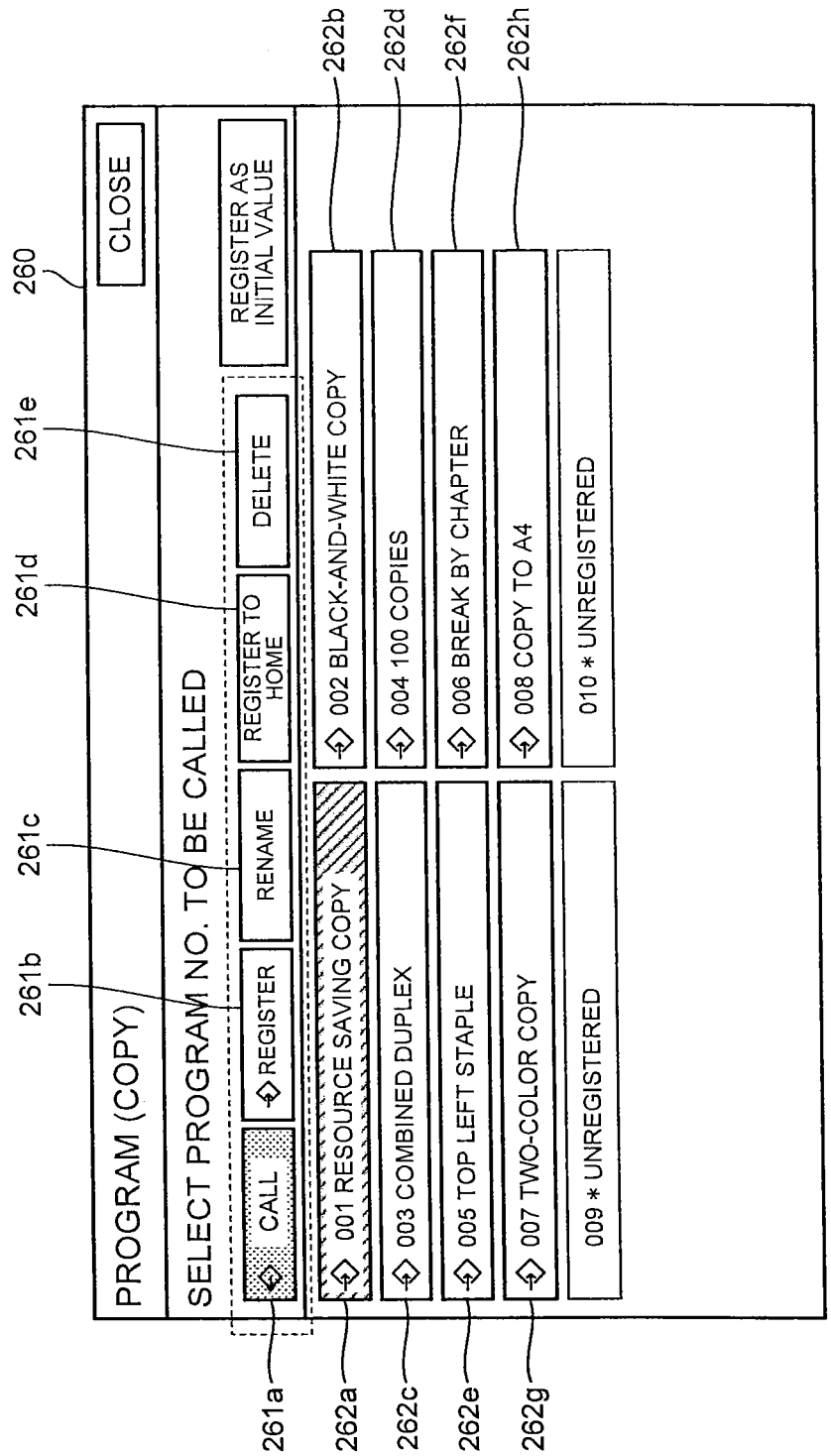

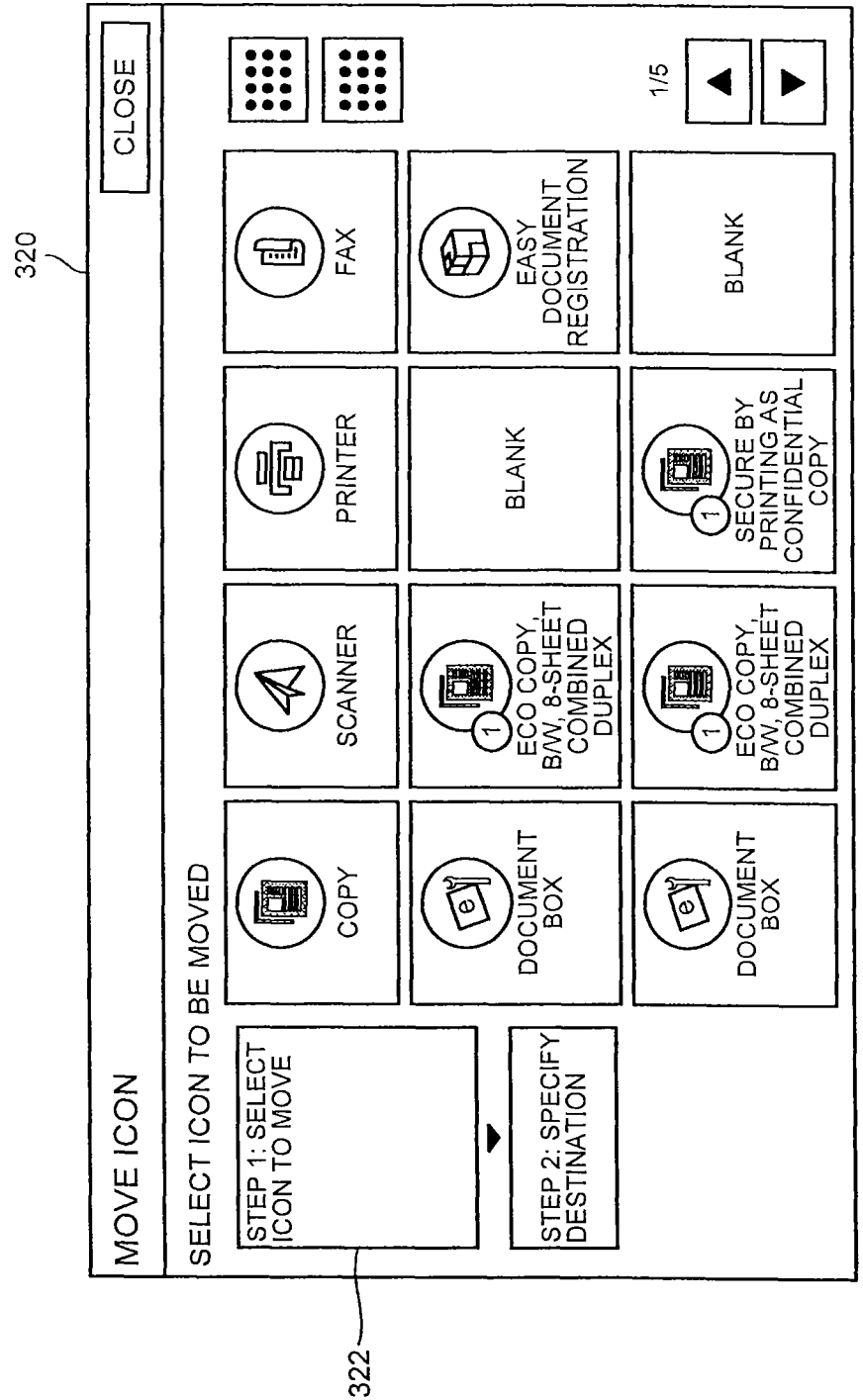

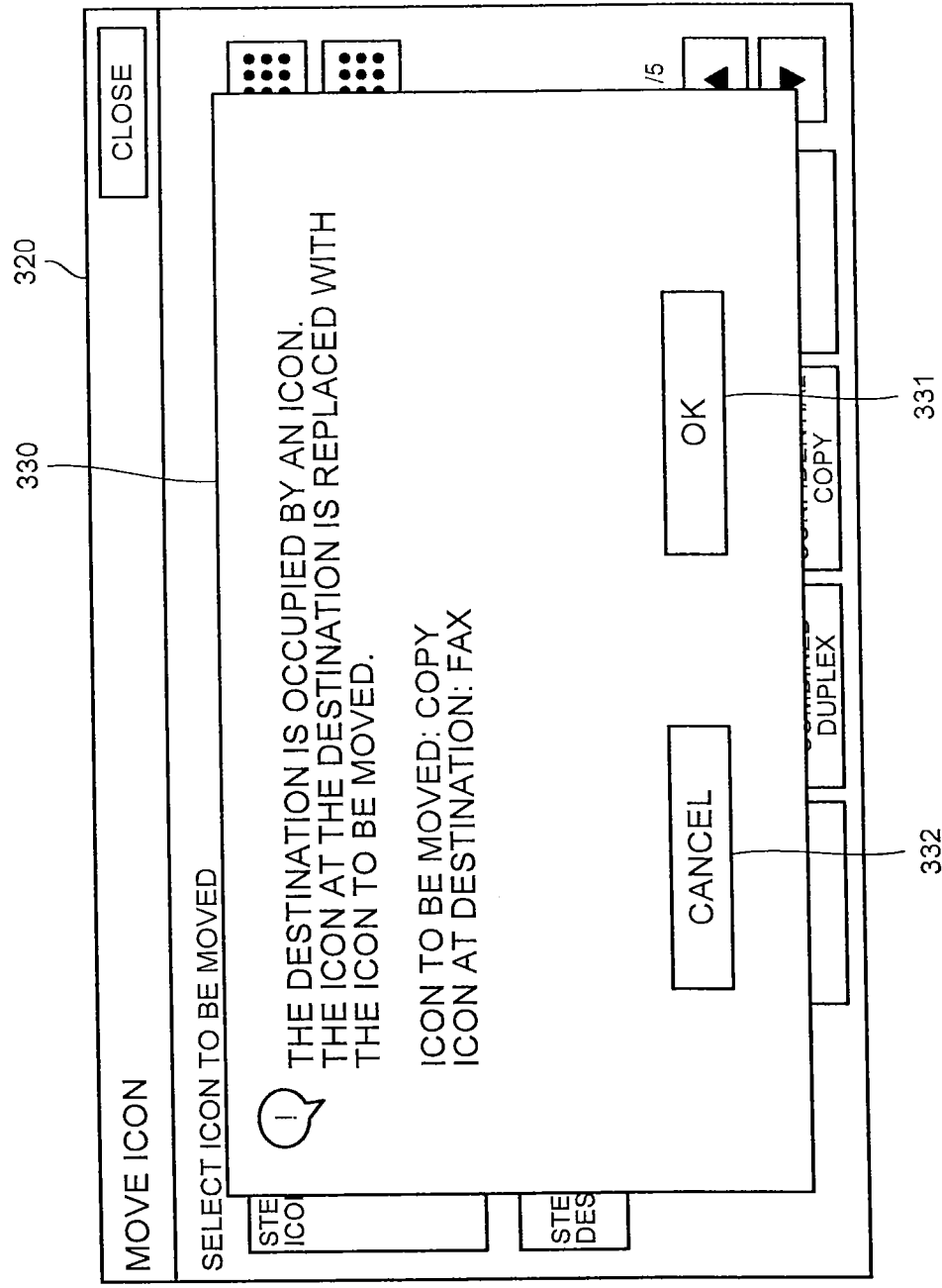

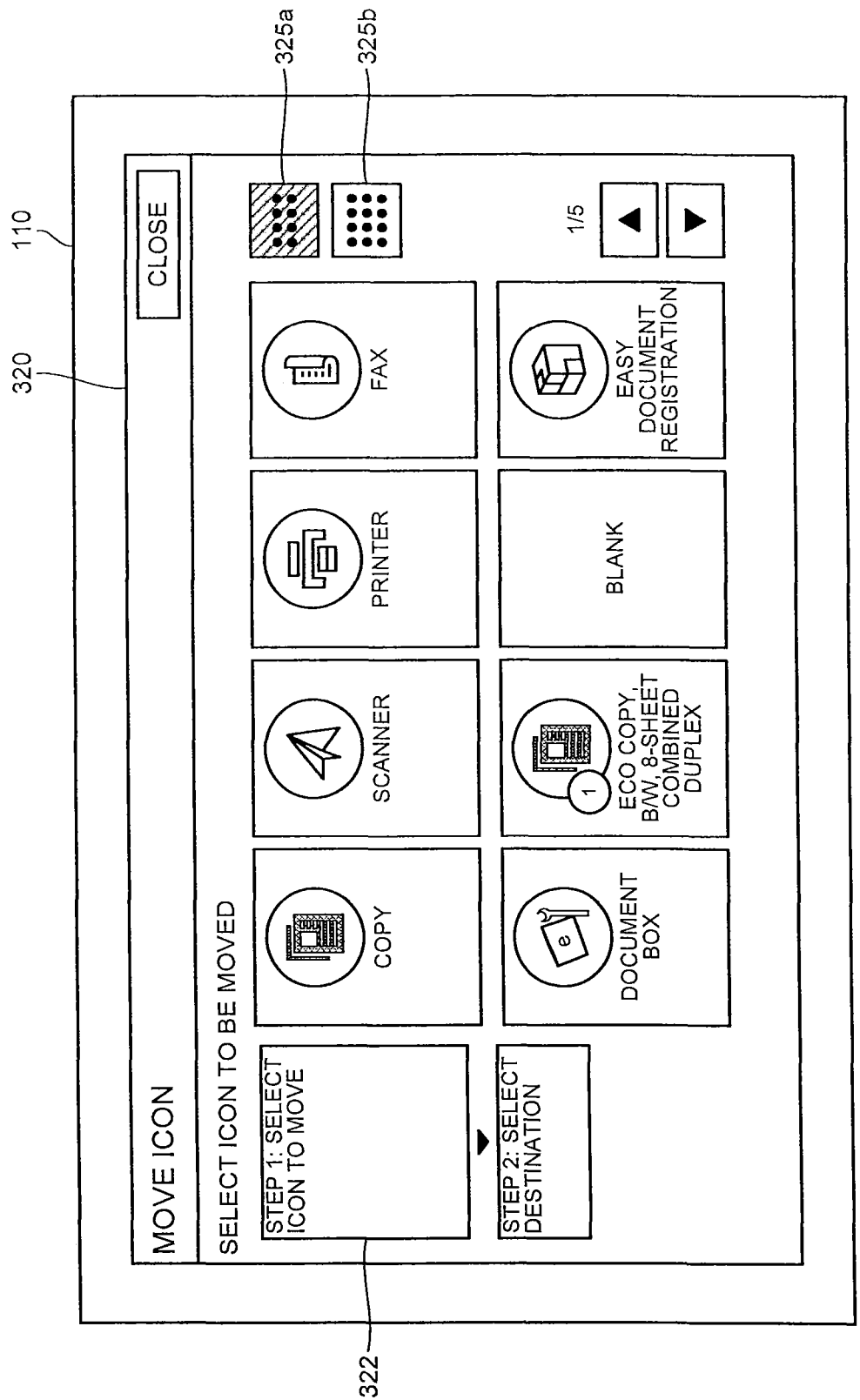

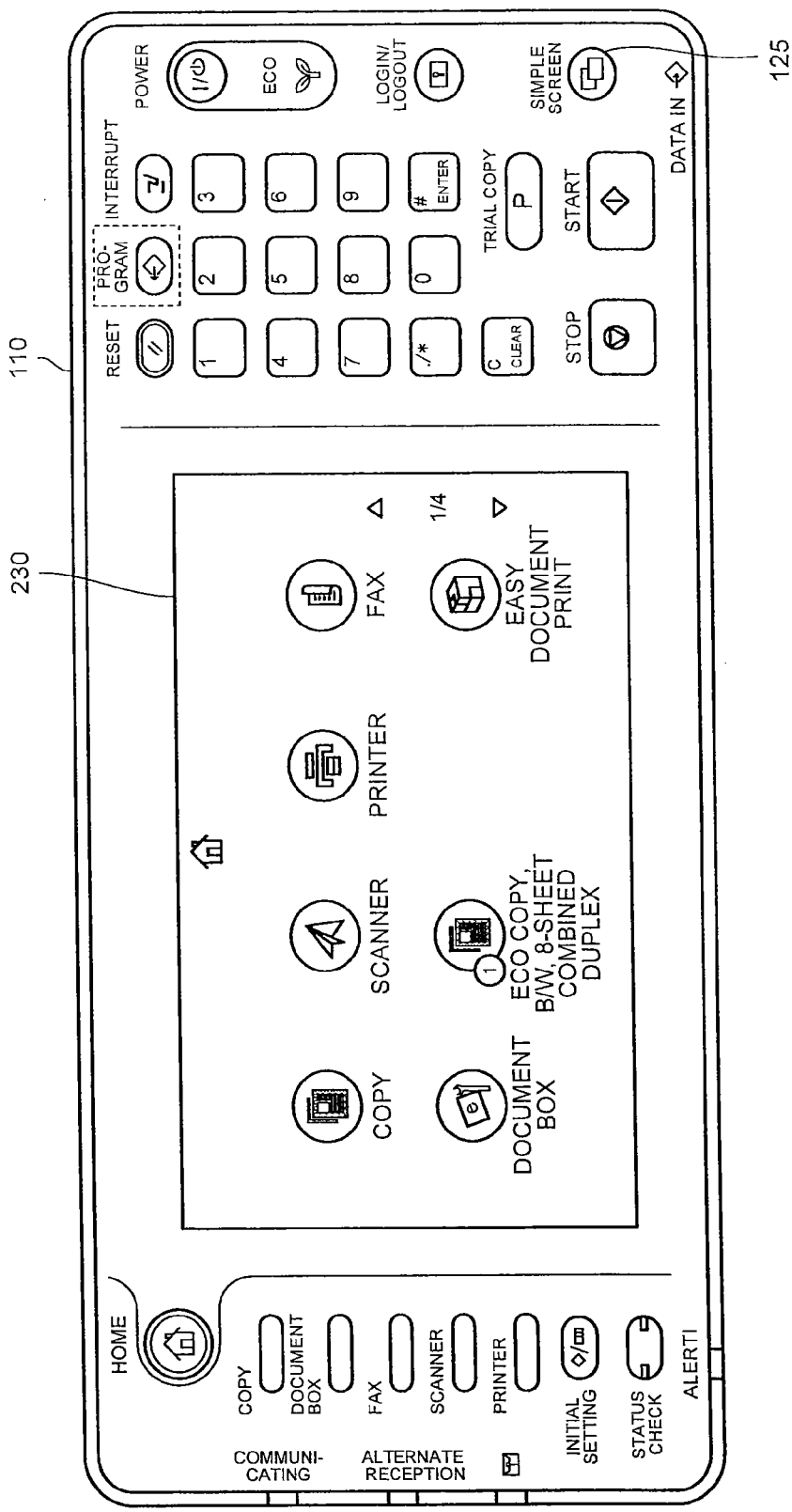

IMAGE PROCESSING APPARATUS, IMAGE PROCESSING METHOD, AND COMPUTER PROGRAM PRODUCT

CROSS-REFERENCE TO RELATED APPLICATIONS

The present application claims priority to and incorporates by reference the entire contents of Japanese Patent Application No. 2011-203057 filed in Japan on Sep. 16, 2011.

BACKGROUND OF THE INVENTION

1. Field of the Invention

The present invention relates to an image processing apparatus, an image processing method, and a computer program product.

2. Description of the Related Art

In recent years, there are known image processing apparatuses called multifunction peripherals (MFPs) each of which contains a plurality of functions of, for example, a copier, a scanner, a printer, and a facsimile apparatus in one housing. Such an MFP is provided with software programs corresponding to the copier, the scanner, the printer, and the facsimile apparatus, and selects and executes each of the software programs so as to operate as each of the copier, the scanner, the printer, and the facsimile apparatus.

Such a conventional MFP is provided with a display/operation unit, such as a touch panel, so that a user can make settings for executing the various functions mentioned above. Recent MFPs have multiple functions and an increased number of items to be set, and thus is required to display a user-friendly setting screen and to reduce a burden of operation for setting by the user.

In order to reduce a burden of operation, for example, Japanese Patent Application Laid-open No. 2009-070365 discloses a technique of an MFP in which, when a user selects a desired item from high-level set items displayed on an operation panel, the operation panel displays overview information on mid-level set items corresponding to the selected high-level set item and low-level set items corresponding to each of the mid-level set items.

There is also known an MFP that can store, in a memory, registered values for set items for predetermined functions entered from the user, and can execute a function using a previously set registered value by calling up the stored register value.

However, in order to execute a predetermined function using a registered value already stored in the memory of the MFP as described above, the user must first display a function list screen on the operation panel and then must select on the function list screen the function to be executed so as to display a list screen of the registered values set for the function to be executed, and the user must further select the desired registered value on the list screen of the registered values, thus resulting in a cumbersome operation. Therefore, there has been a problem that it is troublesome to execute a function for which registered values are set.

Therefore, there is a need for an image processing apparatus, an image processing method, and a computer program product that are capable of executing with a simple operation a function for which registered values are set.

SUMMARY OF THE INVENTION

According to an embodiment, there is provided an image processing apparatus having at least one function for image processing. The image processing apparatus includes an image processing unit that executes the function; a memory that stores therein a function table including function identification information for identifying the function, an initial value set in advance for the function, and a registered value set for the function by a user, in a corresponding manner to each other; a display processing unit that displays, on a display unit, a function list screen on which an initial value button and a first registered value button are arranged, the initial value button being for calling up an initial value function screen that accepts an input of an instruction from the user to execute the function using the initial value corresponding to the function in the memory, and the first registered value button being for calling up a registered value function screen that accepts an input of the instruction from the user to execute the function using the registered value corresponding to the function in the memory; and an accepting unit that accepts a selection of the initial value button or the first registered value button on the function list screen from the user. The display processing unit displays, when the accepting unit has accepted the selection of the initial value button, the initial value function screen corresponding to the initial value button on the display unit, and displays, when the accepting unit has accepted the selection of the first registered value button, the registered value function screen corresponding to the first registered value button on the display unit. The image processing unit executes, when the accepting unit has accepted the execution instruction while the initial value function screen is displayed on the display unit, the function using the initial value corresponding to the initial value function screen, and executes, when the accepting unit has accepted the execution instruction while the registered value function screen is displayed on the display unit, the function using the registered value corresponding to the registered value function screen.

According to another embodiment, there is provided an image processing method executed in an image processing apparatus having at least one function for image processing, the image processing apparatus comprising a memory that stores therein a function table including function identification information for identifying the function, an initial value set in advance for the function, and a registered value set for the function by a user, in a corresponding manner to each other. The image processing method includes displaying, by a display processing unit, on a display unit, a function list screen on which an initial value button and a first registered value button are arranged, the initial value button being for calling up an initial value function screen that accepts an input of an instruction from the user to execute the function using the initial value corresponding to the function in the memory, and the first registered value button being for calling up a registered value function screen that accepts an input of the instruction from the user to execute the function using the registered value corresponding to the function in the memory; accepting, by an accepting unit, a selection of the initial value button or the first registered value button on the function list screen from the user; displaying, by the displaying processing unit, when the accepting unit has accepted the selection of the initial value button, the initial value function screen corresponding to the initial value button on the display unit, and displays, when the accepting unit has accepted the selection of the first registered value button, the registered value function screen corresponding to the first registered value button on the display unit; and executing, by an image processing unit, when the accepting unit has accepted the execution instruction while the initial value function screen is displayed on the display unit, the function using the initial value corresponding to the initial value function screen, and executes, when the accepting unit has accepted the execution instruction while the registered value function screen is displayed on the display unit, the function using the registered value corresponding to the registered value function screen.

According to still another embodiment, there is provided a computer program product including a non-transitory computer-readable medium including programmed instructions. The instructions causes a computer having at least one function for image processing and comprising a memory that stores therein a function table including function for identification information identifying the function, an initial value set in advance for the function, and a registered value set for the function by a user, in a corresponding manner to each other, to execute: displaying, on a display unit, a function list screen on which an initial value button and a first registered value button are arranged, the initial value button being for calling up an initial value function screen that accepts an input of an instruction from the user to execute the function using the initial value corresponding to the function in the memory, and the first registered value button being for calling up a registered value function screen that accepts an input of the instruction from the user to execute the function using the registered value corresponding to the function in the memory; accepting a selection of the initial value button or the first registered value button on the function list screen from the user; displaying, when the accepting unit has accepted the selection of the initial value button, the initial value function screen corresponding to the initial value button on the display unit, and displays, when the accepting unit has accepted the selection of the first registered value button, the registered value function screen corresponding to the first registered value button on the display unit; and executing, when the accepting unit has accepted the execution instruction while the initial value function screen is displayed on the display unit, the function using the initial value corresponding to the initial value function screen, and executes, when the accepting unit has accepted the execution instruction while the registered value function screen is displayed on the display unit, the function using the registered value corresponding to the registered value function screen.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 2 is a diagram illustrating an operation panel 110;

FIGS. 3A to 3C are diagrams illustrating screen examples displayed on a touch panel 130 by a display processing unit 103;

FIG. 6 is a chart illustrating a data structure of an icon table 142;

FIG. 8 is a diagram illustrating screens displayed on the touch panel 130 in the display process;

FIG. 21A is a diagram for explaining screen transition on a move icon screen 320;

FIG. 21D is a diagram for explaining screen transition on the move icon screen 320;

FIG. 25B is a diagram for explaining the display size change process;

FIG. 26B is a diagram for explaining the display size change process; and

DETAILED DESCRIPTION OF THE PREFERRED EMBODIMENTS

Embodiments will be described below in detail with reference to the accompanying drawings.

Figure 1:
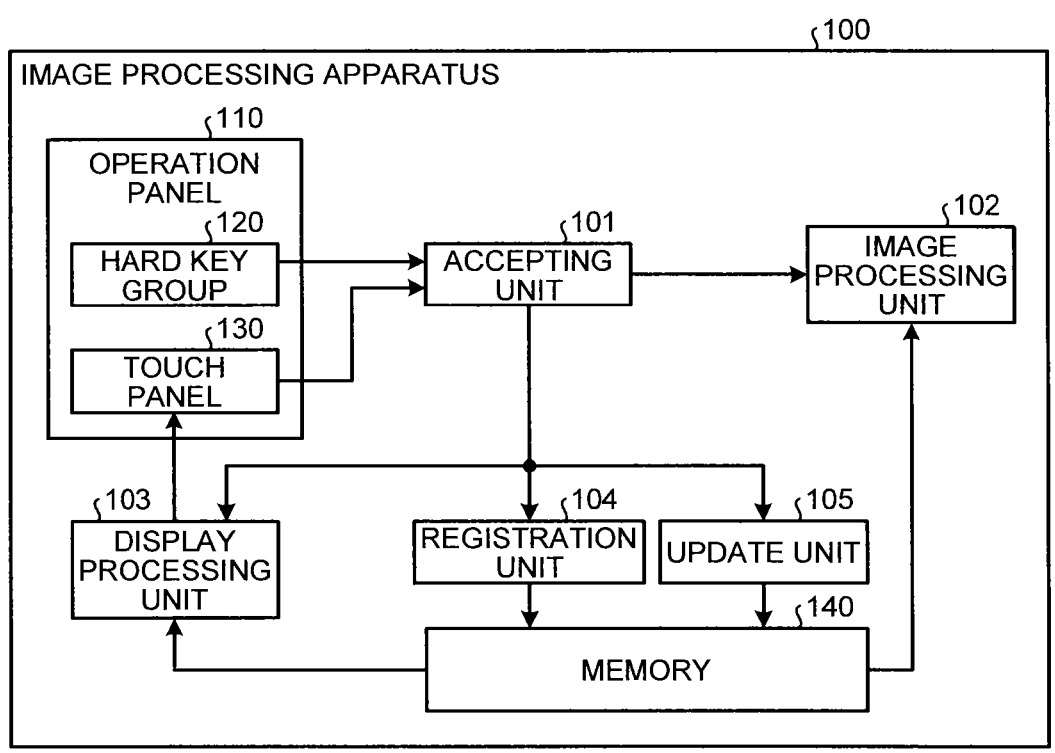
FIG. 1 is a block diagram illustrating a configuration of an image processing apparatus 100 according to an embodiment of the present invention.

FIG. 1 is a block diagram illustrating a configuration of an image processing apparatus 100 according to an embodiment. The image processing apparatus 100 includes a plurality of legacy applications (programs) such as a copy application, a facsimile (fax) application, and a printer application. These applications correspond to functions. Each of the functions is provided with set items required for executing the function. The image processing apparatus 100 stores therein in advance initial values of the set items, and can execute the function using the initial values. A user can set desired values for the respective set items. The image processing apparatus 100 can store the values entered by the user as registered values, can later call up the registered values, and can execute the function using the registered values.

The image processing apparatus 100 includes an operation panel 110, an accepting unit 101, an image processing unit 102, a display processing unit 103, a memory 140, a registration unit 104, and an update unit 105.

The operation panel 110 includes a hard key group 120 having a plurality of hard keys and a touch panel 130, and serves as a user interface. The user can perform a desired input operation on the hard key group 120 and the touch panel 130. The accepting unit 101 accepts information entered from the user on the hard key group 120 and the touch panel 130.

FIG. 2 is a diagram illustrating the operation panel 110. The touch panel 130 of liquid crystal is provided in the center of the operation panel 110, and hard key groups 120a and 120b are provided on both sides of the touch panel 130. A home key 121, a program key 122, a start key 123, an initial set key 124, and a simple screen key 125 are provided as the hard keys. Each of the keys will be described later.

The touch panel 130 accepts input from the user, and displays various operation screens for execution of the functions in the image processing apparatus 100. In other words, the touch panel 130 according to the present embodiment serves as an accepting unit and a display unit.

The image processing unit 102 illustrated in FIG. 1 performs various types of image processing for image data according to the information accepted by the accepting unit 101. The image processing unit 102 executes the multiple functions provided in the image processing apparatus 100, such as the copy application, the facsimile application, and the printer application.

The display processing unit 103 follows the information accepted by the accepting unit 101 and uses information stored in the memory 140 to perform processing for displaying various types of information on the touch panel 130. The operation screens and the like for execution of the functions of the image processing apparatus 100 are displayed on the touch panel 130.

FIGS. 3A to 3C are diagrams illustrating screen examples displayed on the touch panel 130 by the display processing unit 103. A home screen 200 illustrated in FIG. 3A is a screen for allowing the user to select a desired function in the image processing apparatus 100. The home screen 200 displays a plurality of icons corresponding to the respective multiple functions executable in the image processing apparatus 100.

Each of the icons is an icon for calling up a function screen that serves as a screen on which an input of an instruction from the user to execute the function indicated by the icon is accepted. That is, when the user selects a predetermined icon, the display processing unit 103 displays a function screen corresponding to the selected icon on the touch panel 130. When the user presses the start key 123 while the function screen is displayed, the accepting unit 101 accepts the execution instruction. After the accepting unit 101 accepts the execution instruction, the image processing unit 102 executes the function according to the execution instruction.

The home screen 200 according to the present embodiment displays initial value icons and registered value icons. Here, each of the initial value icons is an icon for calling up an initial value function screen 210 that serves as a function screen for accepting an instruction to execute a function using initial values. Each of the registered value icons is an icon for calling up a registered value function screen 220 that serves as a function screen for accepting an instruction to execute a function using registered values. The initial value icons and the registered value icons correspond to initial value buttons and first registered value buttons, respectively. The home screen 200 corresponds to a function list screen.

The home screen 200 illustrated in FIG. 3A displays a copy icon 201a, a scanner icon 201b, a printer icon 201c, a fax icon 201d, and a document box icon 201e, as initial value icons. The home screen 200 also displays a resource saving copy icon 202a and a fax-to-head-office icon 202b, as registered value icons.

When the user selects the copy icon 201a for a function corresponding to initial values on the home screen 200 illustrated in FIG. 3A, the initial value function screen 210 for a copy function is displayed (see FIG. 3B). As illustrated in FIG. 3B, the initial value function screen 210 for the copy function displays initial values of respective set items, such as a simplex print at the same size. When the user presses the start key 123 while the initial value function screen 210 is displayed, the accepting unit 101 accepts the execution instruction for the copy function using the initial values. Then, according to the execution instruction, the image processing unit 102 executes the copy function using initial values corresponding to those on the initial value function screen 210.

On the other hand, when the user selects the resource saving copy icon 202a for a function corresponding to registered values on the home screen 200 illustrated in FIG. 3A, the registered value function screen 220 for the copy function is displayed (see FIG. 3C). As illustrated in FIG. 3C, the registered value function screen 220 displays registered values of the respective set items. When the user presses the start key 123 while the registered value function screen 220 is displayed, the accepting unit 101 accepts the execution instruction for the copy function using the registered values. Then, according to the execution instruction, the image processing unit 102 executes the copy function using registered values corresponding to those on the registered value function screen 220.

The user can change the values of the set items by operating the touch panel 130 while the initial value function screen 210 or the registered value function screen 220 is displayed. In this case, the image processing unit 102 executes the copy function using the values after being changed.

As described above, in the image processing apparatus 100 according to the present embodiment, the display processing unit 103 displays the initial value icons for calling up the initial value function screen 210 and the registered value icons for calling up the registered value function screen 220 on the same home screen 200. Then, the display processing unit 103 displays the initial value function screen 210 on the touch panel 130 when the user has selected an initial value icon, whereas the display processing unit 103 displays the registered value function screen 220 on the touch panel 130 when the user has selected a registered value icon.

Thus, the image processing apparatus 100 according to the present embodiment can display either of the initial value function screen 210 and the registered value function screen 220 immediately following the home screen 200. That is, the initial value function screen 210 and the registered value function screen 220 belong to the same hierarchy. Accordingly, the user can perform an equivalent operation to that for calling up the initial value function screen 210 to call up the registered value function screen 220 through which the user has registered values.

The home screen 200 illustrated in FIG. 3A further displays an easy document print icon 203a, an easy document registration icon 203b, and a browser icon 204.

The easy document print icon 203a and the easy document registration icon 203b are icons for calling up a software development kit (SDK) as a manufacturer supplied custom function provided by a manufacturer of the image processing apparatus 100. More specifically, when the user selects the easy document print icon 203a, the touch panel 130 displays a function screen for executing the SDK as the manufacturer supplied custom function corresponding to the easy document print icon 203a.

Also, the browser icon 204 is an icon for calling up a function provided by an external manufacturer. When the user selects the browser icon 204, the touch panel 130 displays a function screen for executing a browser function corresponding to the browser icon 204.

As described above, the user can perform the equivalent operation to that for calling up the initial value function screen 210 from the home screen 200 to call up the function screens for the manufacturer supplied custom function and for the function provided by the external manufacturer.

In this manner, the home screen 200 can display the icons for calling up the function screens for the manufacturer supplied custom function and for the function provided by the external manufacturer. Therefore, the degrees of utility of these functions can be improved. In addition, the home screen 200 can display icons corresponding to function screens for recommended functions recommended by manufacturers to be used by users, and thus, the degrees of utility of the recommended functions can be improved.

Moreover, in other examples, the display processing unit 103 may arrange on the home screen 200 an icon for calling up an execution screen through which a plurality of functions are executed in a combined manner. With this arrangement, even in the case of a complex function, the user needs to select only one icon, and thus can make the image processing apparatus 100 execute the complex function corresponding to the icon selected by the user.

Figures 4, 5:
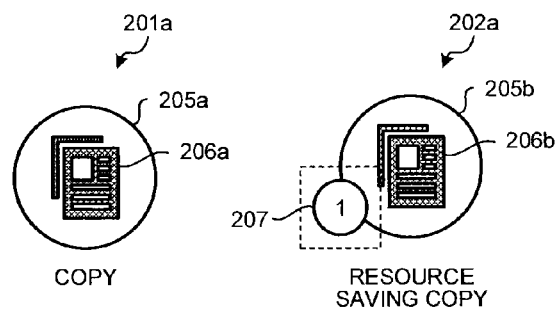
FIG. 4 is a diagram for explaining icons.
FIG. 5 is a chart illustrating a data structure of a common function table 141.

FIG. 4 is a diagram for explaining images of icons. Outer shapes 205a and 205b of the copy icon 201a and the resource saving copy icon 202a, respectively, illustrated in FIG. 4 are both circular. The icons displayed on the home screen 200 are all circular icons as illustrated in FIG. 4. Moreover, each of the initial value icon and the registered value icon for the same function includes, at the center thereof, an image designed depending on the function, and the inside of the circular icon is colored in a color depending on the function. The copy icon 201a and the resource saving copy icon 202a illustrated in FIG. 4 includes, at the respective centers thereof, document images 206a and 206b, respectively. Thus, icons for the same function include a common image.

In addition, a name of a function to which a registered value has been set is displayed on the registered value icon, and an image indicating that the function is a function to which the registered value has been set. On the resource saving copy icon 202a illustrated in FIG. 4, a name of a function to which a registered value has been set, i.e., "Resource Saving Copy", is displayed, and an encircled numeral 207 of number "1" as the image indicating that the function is a function to which a registered value has been set is attached to the circular icon. The initial value icon and the registered value icon are distinguished as different images as a whole depending on whether the encircled numeral is attached thereto. Thus, the user can visually distinguish whether an icon is an initial value icon or a registered value icon.

Referring back to FIGS. 3B and 3C, the icon selected by the user on the home screen 200 is displayed at the upper left of each of the initial value function screen 210 and the registered value function screen 220. More specifically, when the initial value icon for the copy function, i.e., the copy icon 201a, is selected on the home screen 200 and then the initial value function screen 210 for the copy function is displayed, as illustrated in FIG. 3B, an icon 211 identical to the initial value icon for the copy function, i.e., the copy icon 201a, is displayed on the initial value function screen 210 for the copy function. On the other hand, when the registered value icon for the copy function, i.e., the resource saving copy icon 202a, is selected on the home screen 200 and then the corresponding registered value function screen 220 is displayed, an icon 221 identical to the resource saving copy icon 202a that is the registered value icon is displayed on the registered value function screen 220 as illustrated in FIG. 3C.

In this way, by displaying the icon selected on the home screen 200 onto the initial value function screen 210 or the registered value function screen 220, the user can check which function is intended by the initial value function screen 210 or the registered value function screen 220 currently displayed.

In this example, the registered value icon 202a is not completely identical to the icon 221 displayed on the registered value function screen 220, and the icon 221 displayed on the registered value function screen 220 is not attached with the encircled numeral. However, in other examples, the icon 221 displayed on the registered value function screen 220 may be attached with the encircled numeral.

Referring back to FIG. 1, the memory 140 stores therein function tables that store information on values set for set items for respective functions. The memory 140 stores, as the function tables, a common function table that stores therein information on functions available for use by all users and a user function table that is provided for each authenticated user and stores therein information set by the user. The memory 140 also stores therein an icon table that stores therein the function icons described in FIG. 3A. The function tables and the icon table are tables that are referred to by the display processing unit 103. The registration unit 104 registers new information in the function tables. The update unit 105 updates the information stored in the function tables.

FIG. 5 is a chart illustrating a data structure of the common function table 141. The common function table 141 stores therein function IDs that identify functions, registered value IDs that identify registered values set for the functions, the names of the functions to which the registered values have been set, set values, necessity of display on the home screen, and display positions on the home screen, in a corresponding manner to each other. The set values are values to be set for the respective functions, and specifically, the initial values or the registered values are stored as the set values. The registered values, the registered value IDs and the names are values entered by the user and accepted by the accepting unit 101, and are registered by the registration unit 104.

The "necessity of display on the home screen" refers to information specifying whether to display the registered value icon corresponding to the registered values on the home screen, and is specified by the user. The "necessity of display on the home screen" corresponds to display specification information. The display position on the home screen refers to information indicating the display position of the registered value icon corresponding to the registered values on the home screen in the case of displaying the registered value icon on the home screen.

The home screen 200 of the image processing apparatus 100 of the present embodiment displays five icons in a horizontal row, as illustrated in FIG. 3A. In the present embodiment, the upper left position of the home screen 200 is specified as a display position "1", and the subsequent positions in the horizontal row are sequentially specified as display positions "2" to "5". Furthermore, the left end in the second row is specified as a display position "6". The subsequent display positions are specified in the same manner. That is, in the example illustrated in FIG. 3A, the display positions of the copy icon 201*a*, the scanner icon 201*b*, and the resource saving copy icon 202*a* are "1", "2", and "6", respectively.

The data structure of the common function table 141 has been described above. The data structure of the user function table is similar to that of the common function table 141.

The image processing apparatus 100 according to the present embodiment stores therein the common function table 141 and the user function table. Therefore, each of the tables can store therein the function IDs for different functions and pieces of information corresponding to the function IDs. Accordingly, an administrator can limit the functions available for use by each user by registering in advance the functions allowed to be used by the user in the user function table. The details will be described later.

FIG. 6 is a chart illustrating a data structure of the icon table 142. The icon table 142 stores therein the function IDs and the icon images in a corresponding manner to each other. The data structures of the common function table 141, the user function table, and the icon table 142 described in the present embodiment are examples, and only need to store the pieces of information so that the correspondence relationships therebetween can be identified. Thus, the data structures are not limited to those of the embodiment. For example, various types of data may be stored in a text file format such as an Extensible Markup Language (XML) format instead of in the table structure. In that case, the pieces of information explained in FIGS. 5 and 6 shall be described so that the correspondence relationships between the respective pieces of information can be identified.

Figure 7:
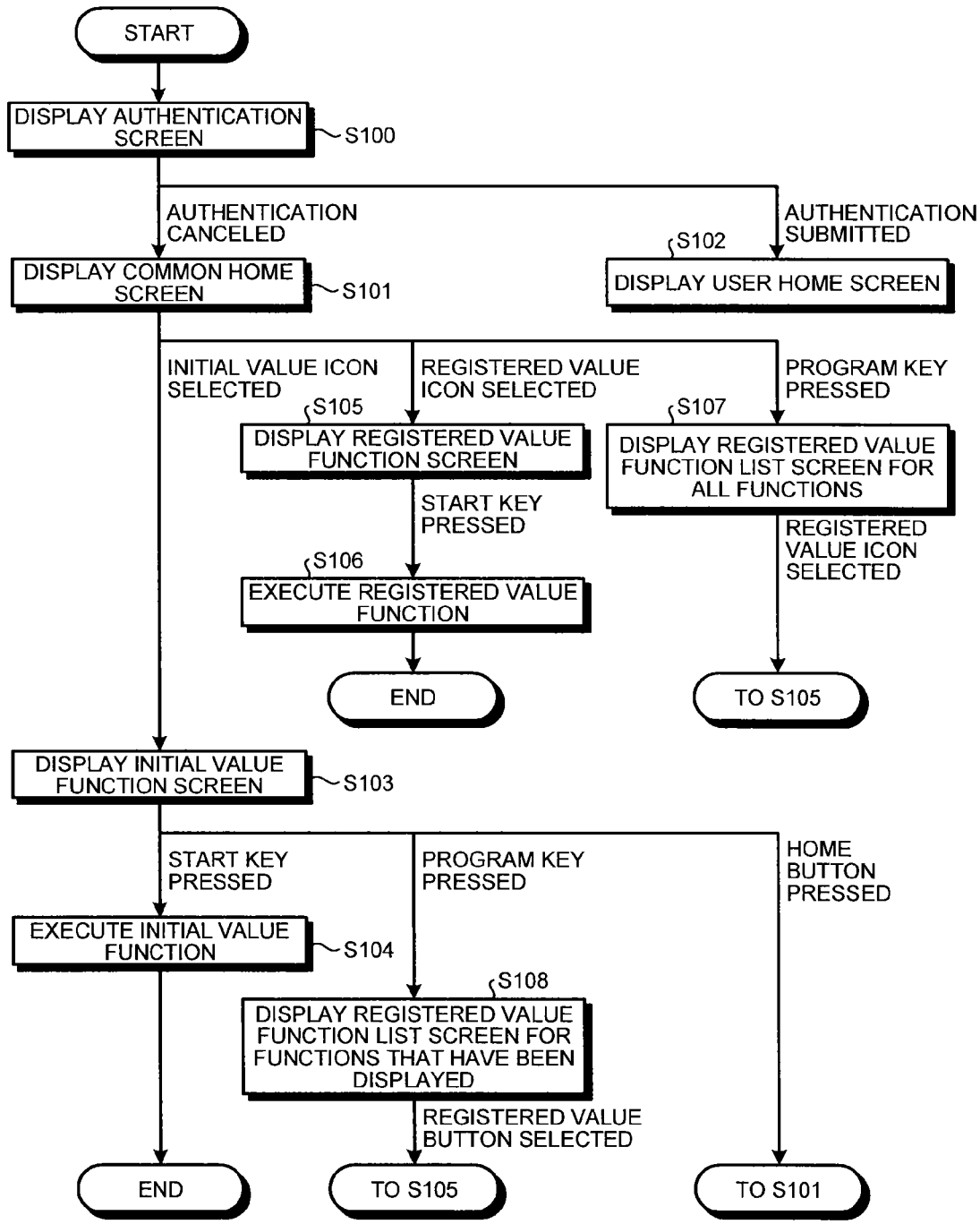
FIG. 7 is a flowchart illustrating a display process for screen display onto the touch panel 130 of the image processing apparatus 100.

FIG. 7 is a flowchart illustrating a display process for screen display onto the touch panel 130 of the image processing apparatus 100. FIGS. 8, 9A to 9E, and 10A to 10C are diagrams illustrating screens displayed on the touch panel 130 in the display process.

After the image processing apparatus 100 is powered on, the display processing unit 103 displays an authentication screen 400 illustrated in FIG. 8 on the touch panel 130 (Step S100). As illustrated in FIG. 8, arranged on the authentication screen 400 is an entry field 401 for authentication information, a "Submit Authentication" button 402, and a "Cancel Authentication" button 403.

If the user selects the "Cancel Authentication" button 403 on the authentication screen 400, the accepting unit 101 accepts an instruction that the user authentication is not to be performed. After the accepting unit 101 accepts the instruction that the user authentication is not to be performed, the display processing unit 103 displays a common home screen 230 illustrated in FIG. 8 on the touch panel 130 (Step S101).

When displaying the common home screen 230, the display processing unit 103 refers to the common function table 141 stored in the memory 140. Specifically, the display processing unit 103 identifies initial values and registered values corresponding to "Yes" for the necessity of the display on the home screen from among initial values and registered values for respective functions stored in the common function table 141. Then, the display processing unit 103 identifies, from the icon table 142 illustrated in FIG. 6, icons corresponding to the initial values and the registered values thus identified. Then, the display processing unit 103 arranges each of the icons corresponding to the initial values and the registered values identified in the common function table 141 in each of the display positions corresponding to the initial values and the registered values, respectively, in the common function table 141, and thus, obtains the common home screen 230. The display processing unit 103 attaches the encircled numeral to each of the icons of registered values, and displays the name of the function to which a registered value has been set.

The common home screen 230 illustrated in FIG. 8 displays, as initial value icons, a copy icon 231*a*, a scanner icon 231*b*, a printer icon 231*c*, a fax icon 231*d*, and a document box icon 231*e*. The common home screen 230 also displays, as registered value icons, a resource saving copy icon 232*a* and a fax-to-head-office icon 232*b*. The common home screen 230 further displays an easy document print icon 233*a*, an easy document registration icon 233*b*, and a browser icon 234.

On the other hand, if the user selects the "Submit Authentication" button 402 on the authentication screen 400, the accepting unit 101 accepts an instruction that the user authentication is to be performed. After the accepting unit 101 accepts the instruction that the user authentication is to be performed, the display processing unit 103 displays a user home screen 240 for the authenticated user on the touch panel 130 (Step S102).

In this case, the display processing unit 103 refers to the user function table that is stored in the memory 140 in a corresponding manner to a user ID of the authenticated user.

The specific processing of the display processing unit 103 is the same as that for displaying the common home screen 230.

The user home screen 240 illustrated in FIG. 8 displays, as initial value icons, a copy icon 241a, a scanner icon 241b, and a printer icon 241c. The user home screen 240 also displays, as registered value icons, a resource saving copy icon 242a and a confidential copy 242b.

In this manner, the user home screen 240 can be displayed separately from the common home screen 230, and icons that differ user by user can be arranged on each user home screen.

The user home screen 240 further displays a user image 243 in addition to the initial value icons and the registered value icons. Thus, the user home screen 240 can be distinguished from the common home screen 230 by displaying the user image 243 for each user on the user home screen 240. The user image 243 is stored in the memory 140 in a corresponding manner to user identification information. The arrangement position of the user image 243 is not limited to that of the embodiment, but the user image 243 can be displayed in any position.

As described above, the common home screen 230 displays only the icons for initial values and registered values for the functions registered in the common function table 141, whereas the user home screen 240 displays only the icons for initial values and registered values for the functions registered in the user function table of each user. Therefore, the user cannot use functions except the functions corresponding to the icons displayed on the common home screen 230 or the user's own user home screen 240.

That is, once the administrator of the image processing apparatus 100 registers only functions available for use by each user in the user function table for the user, the home screen for use by the user displays only the icons for the functions available for use by the user. Thus, the administrator can notify each user of functions available for use by the user only by registering the functions in the user function table.

A description will be made below of a display process for screen transition from the common home screen 230, with reference to FIG. 7. Note that a display process for screen transition from the user home screen 240 is the same as the display process for screen transition from the common home screen 230.

In FIG. 7, if the user selects an initial value icon while the common home screen 230 illustrated in FIG. 8 is displayed on the touch panel 130, the display processing unit 103 displays on the touch panel 130 the initial value function screen 210 (refer to FIG. 3B) corresponding to the selected initial value icon (Step S103). If the user presses the start key 123 while the initial value function screen 210 is displayed, the image processing unit 102 executes the function using initial values corresponding to those on the initial value function screen 210 (Step S104), and the display process is terminated.

For example, if the start key 123 is pressed while the initial value function screen 210 for the copy function illustrated in FIG. 3B is displayed, the image processing unit 102 executes the copy function using the initial values.

If, at Step S101, the user selects a registered value icon while the common home screen 230 is displayed, the display processing unit 103 displays on the touch panel 130 the registered value function screen 220 (refer to FIG. 3C) corresponding to the selected registered value icon (Step S105). If the user presses the start key 123 while the registered value function screen 220 is displayed, the image processing unit 102 executes the function using registered values corresponding to those on the registered value function screen 220 (Step S106), and the display process is terminated.

For example, if the start key 123 is pressed while the registered value function screen 220 for the copy function illustrated in FIG. 3C is displayed, the image processing unit 102 executes the copy function using the registered values for resource saving copy.

As described above, arranged on the common home screen 230 is the initial value icons and the registered value icons, and if an initial value icon is selected, the initial value function screen 210 is displayed that accepts an execution instruction for the function using initial values, while if a registered value icon is selected, the registered value function screen 220 is displayed that accepts an execution instruction for the function using registered values. Thus, the user can call up the registered value function screen 220 using the equivalent operation to that used for calling up the initial value function screen 210. In other words, a simple operation makes it possible to execute the function using registered values.

Figure 9A:
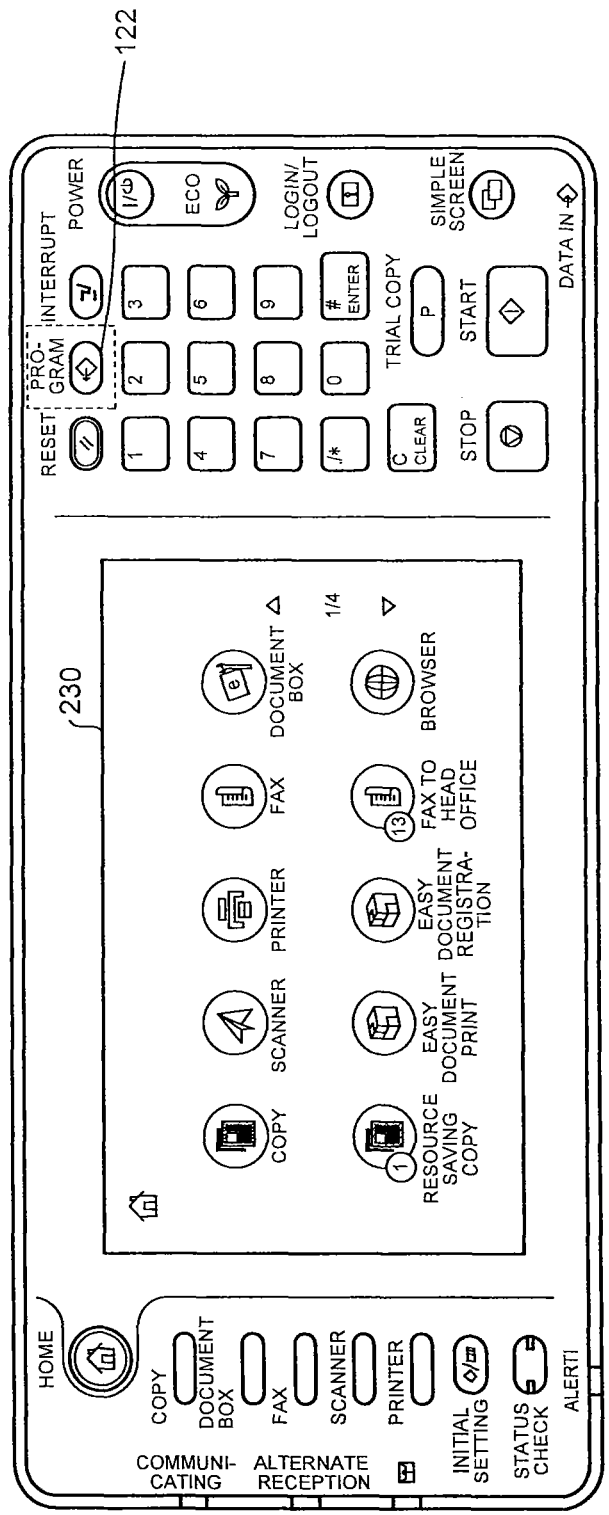
FIG. 9 is a diagram illustrating screens displayed on the touch panel 130 in the display process.

If, at Step S101, the user presses the program key 122 while the common home screen 230 is displayed as illustrated in FIG. 9A, the display processing unit 103 displays on the touch panel 130 a registered value function list screen 250 illustrated in FIG. 9B that displays registered value icons for all functions (Step S107). The registered value function list screen 250 displays all registered value icons corresponding to the registered values stored in the common function table 141. That is, the registered value function list screen 250 displays even the registered value icons corresponding to the registered values and "No" for the necessity of the display on the home screen in the common function table 141.

As illustrated in FIG. 9B, the registered value function list screen 250 displays tabs 251a to 251d for four functions of copy, scanner, fax, and document box, and when the user selects a desired tab, the display processing unit 103 displays a list of registered value icons for functions included in the tab selected by the user. That is, selecting a tab can switch the registered value icons to be displayed.

As illustrated in FIG. 9B, if the user selects, for example, the copy tab 251a, the registered value icons for the registered values corresponding to the copy functions in the common function table 141 are listed to be displayed on the registered value function list screen 250. Alternatively, if the user selects the scanner tab 251b, the registered value icons corresponding to the scanner function registered in the common function table 141 are listed to be displayed on the registered value function list screen 250 as illustrated in FIG. 9C.

If the user selects a desired registered value icon while the registered value function list screen 250 is displayed on the touch panel 130, the process proceeds to Step S105, and displays the registered value function screen 220 corresponding to the selected registered value icon (Step S105).

Figure 9D:
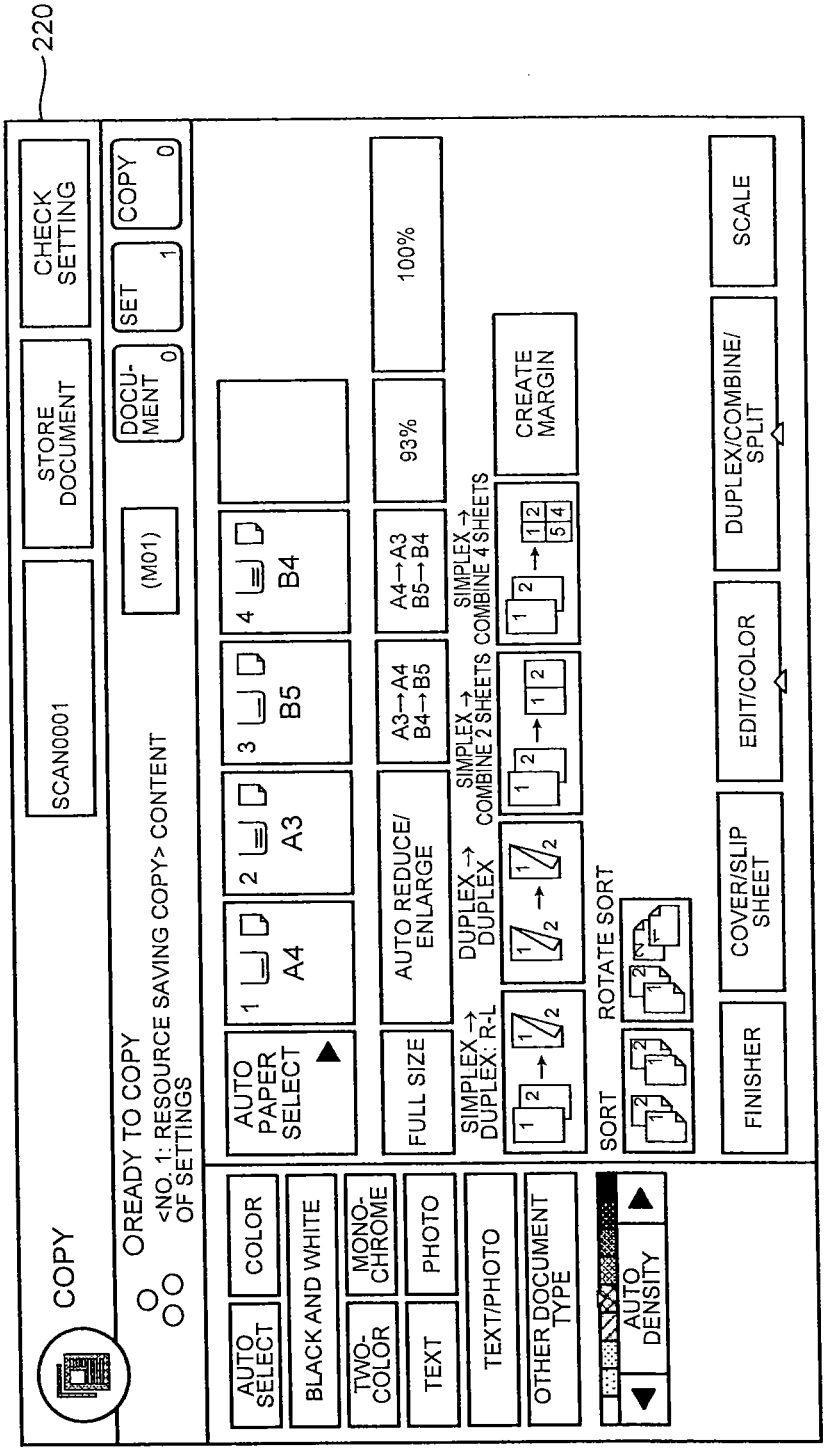

If, for example, the user selects the registered value icon for the resource saving copy while registered value icons for the copy functions are listed, the registered value function screen 220 for the resource saving copy is displayed as illustrated in FIG. 9D (Step S105). On the other hand, if the user selects a registered value icon for saving at 300 dots per inch (dpi) while registered value icons for the scanner functions are listed, a registered value function screen 222 for saving at 300 dpi is displayed as illustrated in FIG. 9E (Step S105).

Figure 10A:
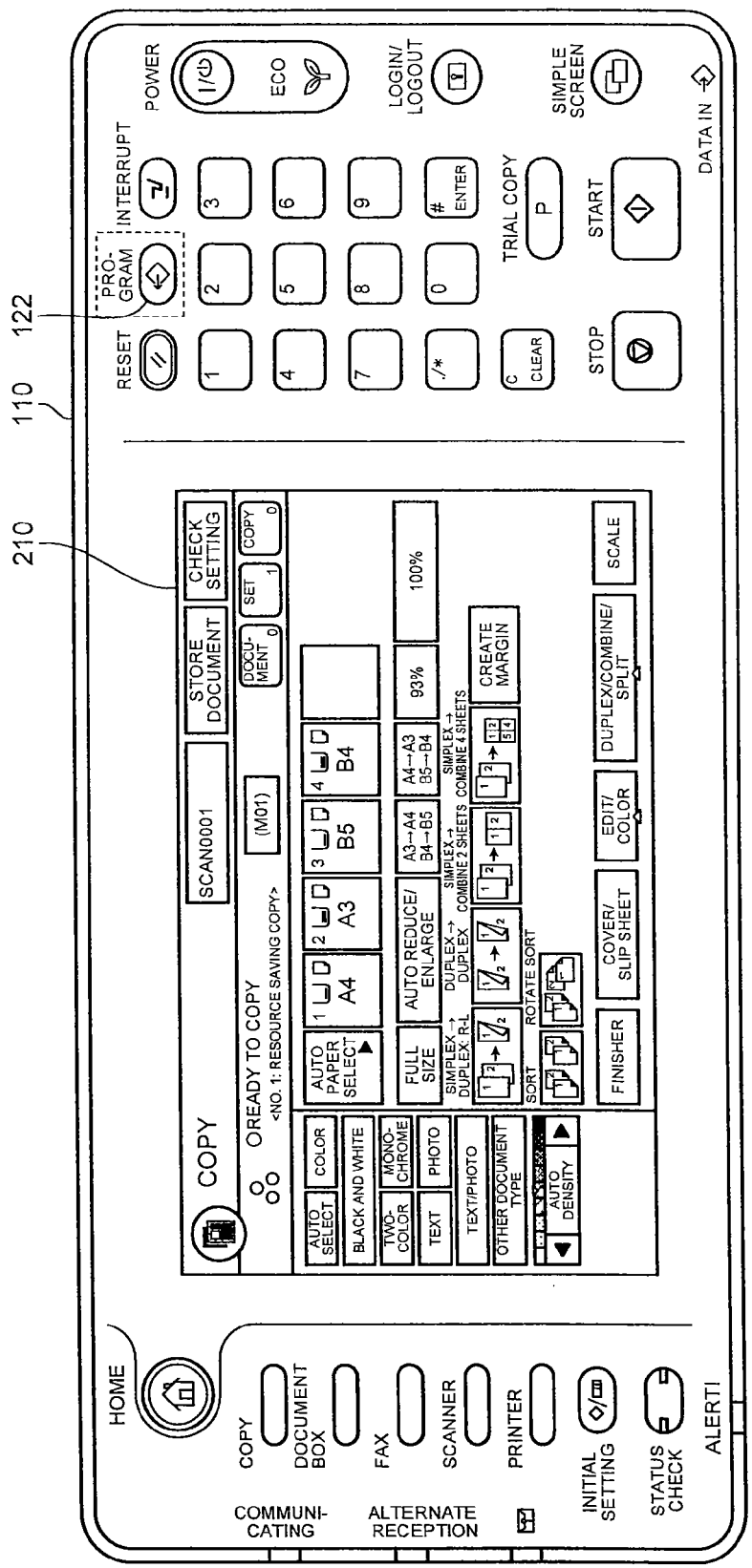
FIG. 10 is a diagram illustrating screens displayed on the touch panel 130 in the display process.

Referring back to FIG. 7, if the user presses the program key 122 while the initial value function screen 210 is displayed at Step S103, the display processing unit 103 displays on the touch panel 130 a registered value function list screen 260 for the functions that have been displayed at Step S103 (Step S108). If the initial value function screen 210 for the copy function has been displayed as illustrated in FIG. 10A at Step S103, the registered value function list screen 260 for the copy functions is displayed as illustrated in FIG. 10B at Step S108.

The registered value function list screen 260 displays all registered value icons corresponding to the registered values stored in the common function table 141. That is, the registered value function list screen 260 displays even the registered value icons corresponding to the registered values and "No" for the necessity of the display on the home screen in the common function table 141.

As illustrated in FIG. 10B, the registered value function list screen 260 displays a call button 261a, a registered value button 261b, a rename button 261c, a register-to-home button 261d, and a delete button 261e, as purpose selection buttons. Selecting the call button 261a lists registered value buttons 262a to 262h for calling up the registered value function screen 220 from this screen, as illustrated in FIG. 10B. The purpose selection buttons other than the call button 261a will be described later.

If the user selects a desired registered value button while the registered value function list screen 260 is displayed, the process proceeds to Step S105, and displays the registered value function screen 220 corresponding to the selected registered value button (Step S105).

Figure 10C:
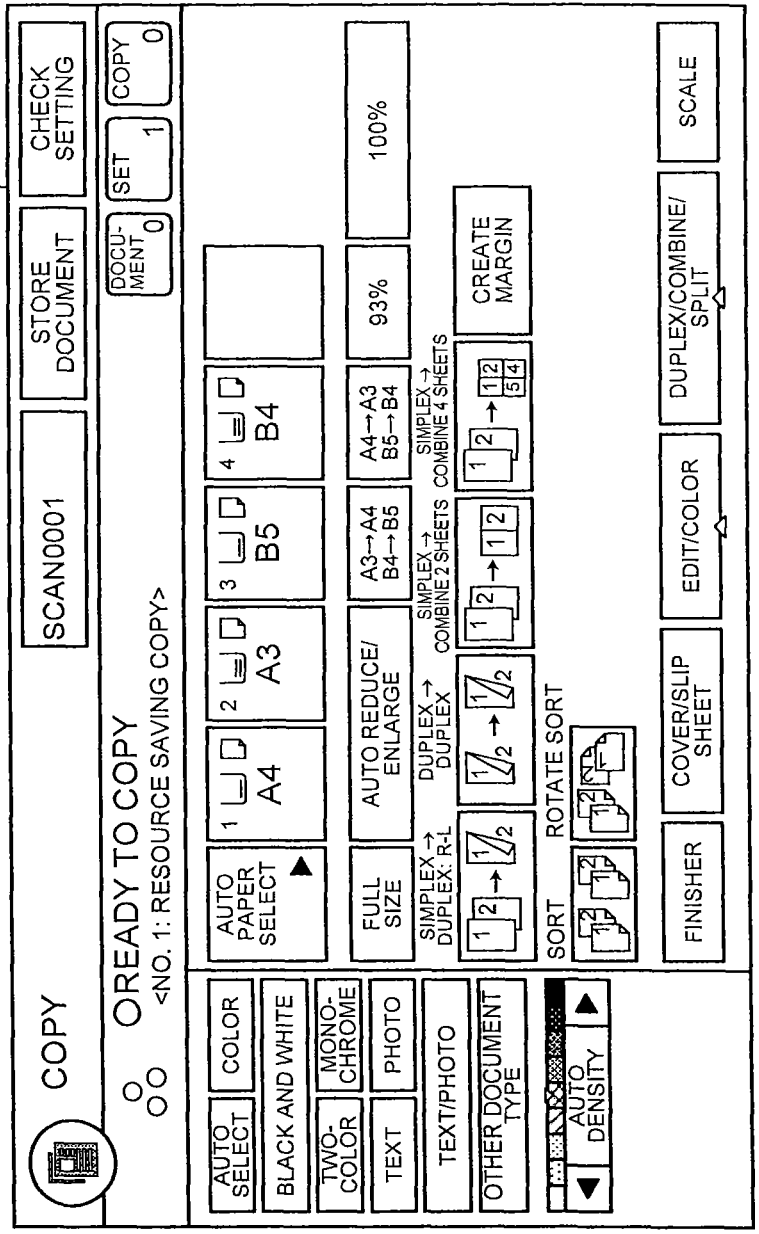

If the user selects the resource saving copy button 262a (the registered value button) as illustrated in FIG. 10B, the process proceeds to Step S105, and displays the registered value function screen 220, as illustrated in FIG. 10C, for the resource saving copy corresponding to the selected resource saving copy button 262a (Step S105).

Thus, the registered value function screen 220 can be displayed, not only by selecting a registered value icon from the common home screen 230, but also by pressing the program key 122 while the initial value function screen 210 is displayed to display the registered value function list screen 260, and then selecting a desired registered value button on the registered value function list screen 260.

In the present embodiment, the registered value buttons 262a to 262h displayed on the registered value function list screen 260 are rectangular buttons. However, in other examples, the registered value buttons 262a to 262h displayed on the registered value function list screen 260 may be, for example, images having the same shape as the registered value icons displayed on the common home screen 230 or on the registered value function list screen 250 displayed at Step S107. The registered value buttons 262a to 262h displayed on the registered value function list screen 260 correspond to second registered value buttons and third registered value buttons.

While any screen is displayed, if the user presses the home key 121, the process returns to Step S101, and the display processing unit 103 displays the common home screen 230 on the touch panel 130.

Figure 11A:
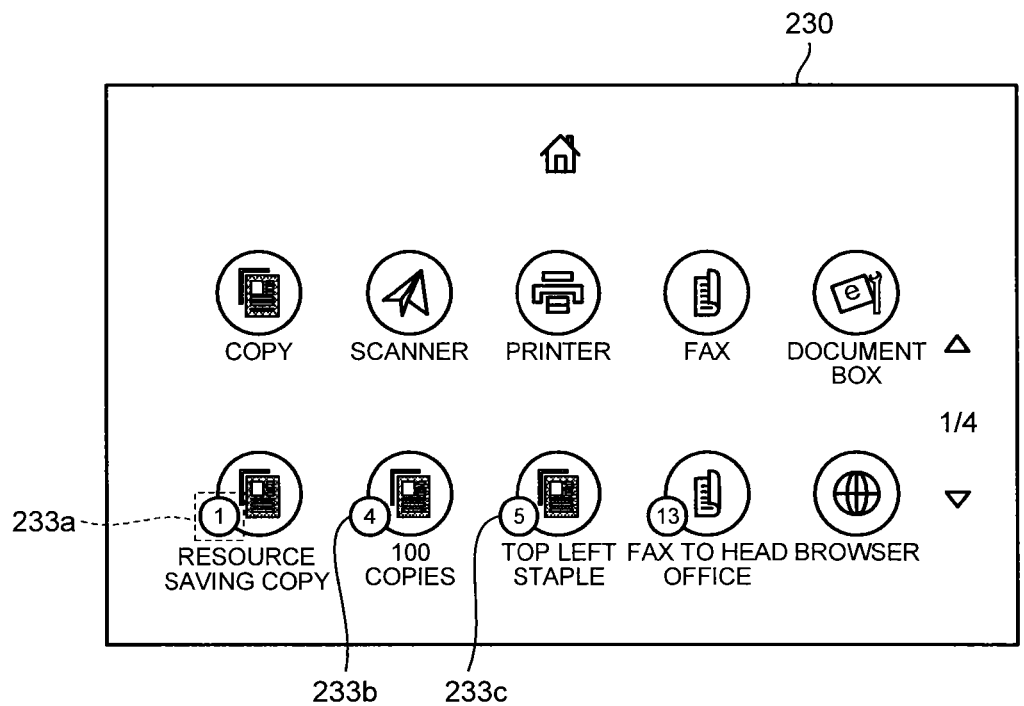
FIGS. 11A to 11C are diagrams for explaining registered value IDs and necessity of display on a home screen.
Figure 11B:
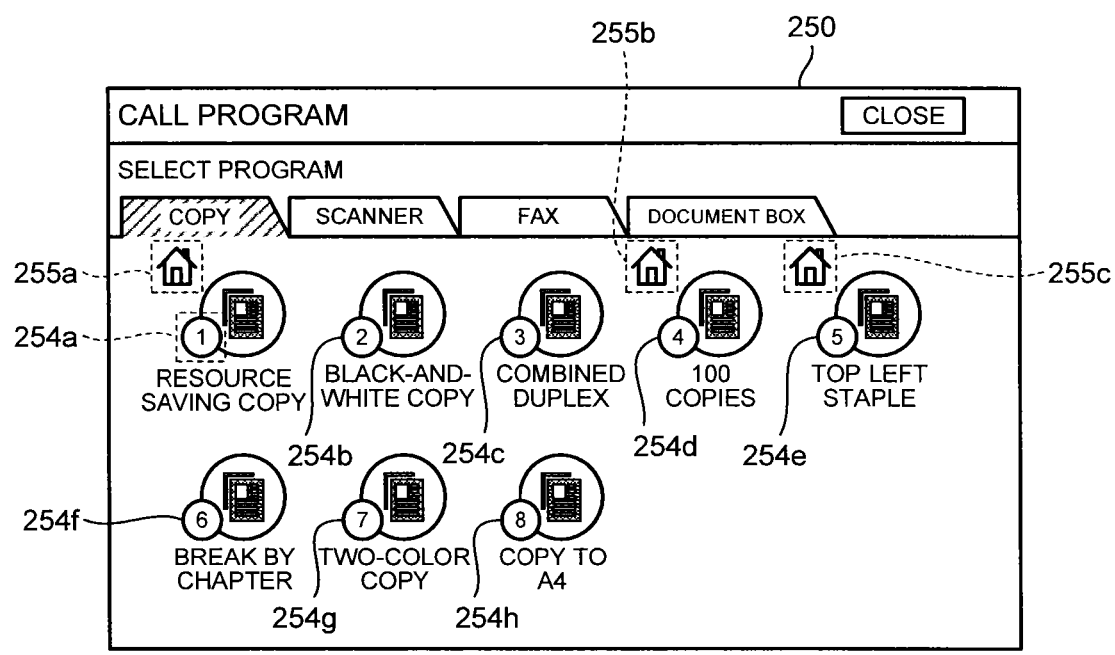
Figure 11C:
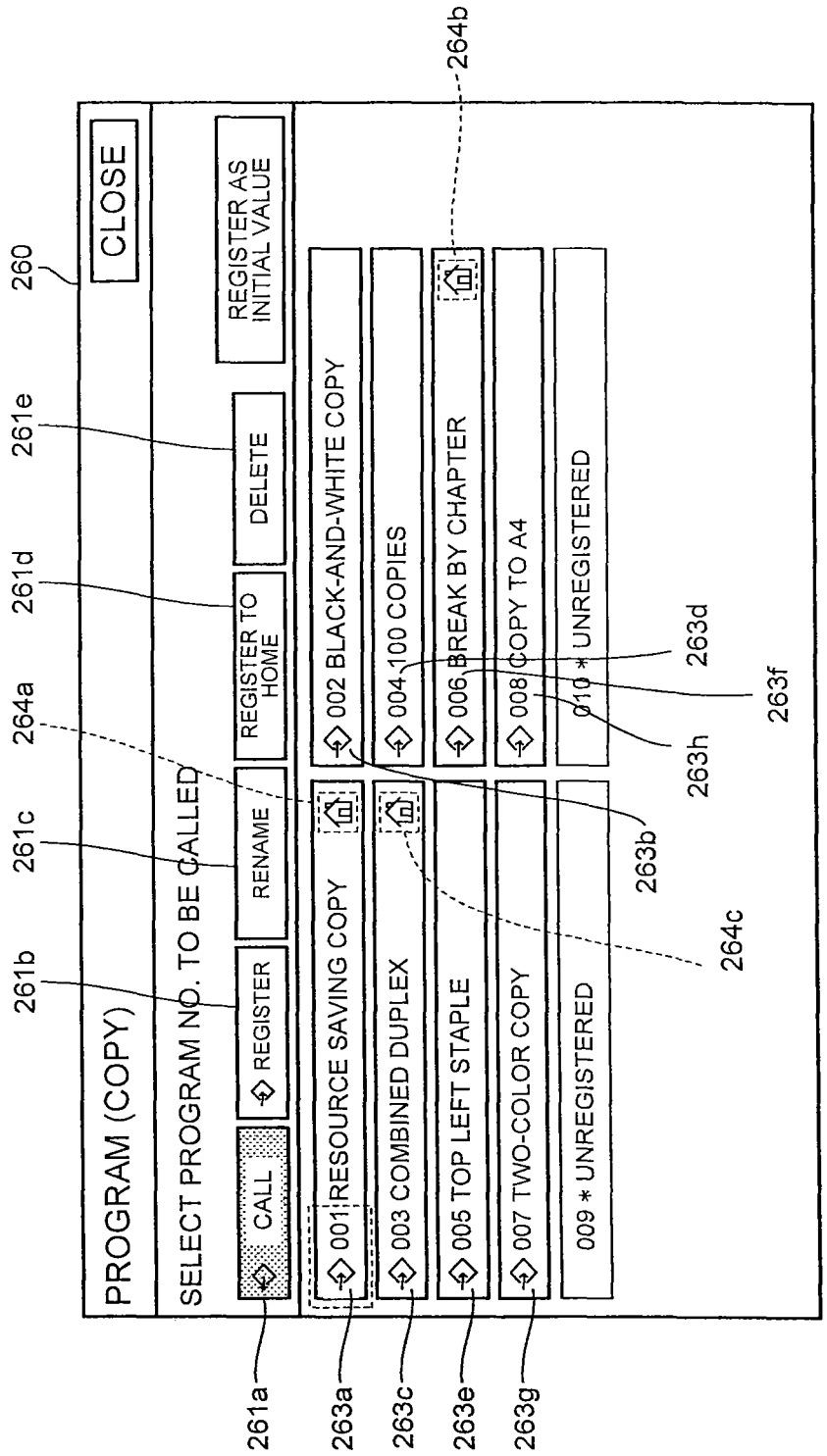

FIGS. 11A to 11C are diagrams for explaining the registered value IDs and the necessity of display on the home screen. Numbers, which are represented by the reference numerals 233a to 233c, attached to the registered value icons displayed on the common home screen 230 illustrated in FIG. 11A are the same numbers as the registered value IDs corresponding to the registered values in the common function table 141. Similarly, numbers, which are represented by the reference numerals 254a to 254h illustrated in FIG. 11B, attached to the registered value icons displayed on the registered value function list screen 250 for all functions that is displayed at Step S107 are the same numbers as the registered value IDs corresponding to the registered values in the common function table 141. Similarly, numbers, which are represented by the reference numerals 263a to 263h illustrated in FIG. 11C, attached to the registered value buttons displayed on the registered value function list screen 260 for predetermined functions that is displayed at Step S108 are the same numbers as the registered value IDs corresponding to the registered values in the common function table 141.

For example, a number "1" is attached to all of the registered value icons and the registered value buttons for the resource saving copy serving as a function to which registered values have been set.

In this manner, on each of the screens, the same numbers are given to the same registered value IDs, that is, to the registered value icons and the registered value buttons corresponding to the same registered values. Accordingly, the user can easily recognize that these registered value icons and registered value buttons indicate the same registered values.

In the present embodiment, the same numbers are attached to the registered value icons and the registered value buttons corresponding to the same registered values. However, the attached information is not limited to numbers, but only needs to indicate correspondence to the same registered values.

As illustrated in FIGS. 11B and 11C, on the registered value function list screen 250 for all functions that is displayed at Step S107 and on the registered value function list screen 260 for predetermined functions that is displayed at Step S108, all of the registered value icons and the registered value buttons corresponding to the registered values registered in the common function table 141 are displayed. On the other hand, among the registered values registered in the common function table 141, only the registered value icons corresponding to the registered values for which the necessity of the display on the home screen is "Yes" are displayed on the common home screen 230 displayed at Step S101.

In this manner, the icons displayed on the common home screen 230 can be limited to registered icons desired by the user. Therefore, a desired icon can be easily identified and selected by limiting the number of icons displayed on the common home screen 230, and thus, operability can be improved when a desired function is executed.

As illustrated in FIG. 11B, among the registered value icons displayed on the registered value function list screen 250 for all functions, the registered value icons corresponding to registered values registered to be displayed on the common home screen 230 are attached with home images 255a to 255c indicating that the registered value icons are to be displayed on the common home screen 230.

In the same manner, as illustrated in FIG. 11C, among the registered value buttons displayed on the registered value function list screen 260 for predetermined functions, the registered value buttons corresponding to registered values registered to be displayed on the common home screen 230 are attached with home images 264a to 264c indicating that the registered value buttons are to be displayed on the common home screen 230.

In this manner, on the registered value function list screens 250 and 260, the home images are attached to the registered value icons and the registered value buttons that are to be displayed on the common home screen 230, and thus, the registered value icons and the registered value buttons that are to be displayed on the common home screen 230 are displayed in a display mode different from that of the registered value icons and the registered value buttons that are not to be displayed on the common home screen 230. Accordingly, the user can easily understand in a visual manner which of the icons corresponding to the registered values is to be displayed on the common home screen 230.

Selecting any of the purpose selection buttons 261a to 261e can switch the display of the registered value function list screen 260. On any screen displayed by selecting any of the buttons, a home image is attached to the register button to be displayed on the common home screen 230 in the same manner as illustrated in FIG. 11C.

With reference to FIG. 7, the description has been made above of the display process in the case of displaying the common home screen 230 without performing the user authentication. The display process in the case of displaying the user home screen 240 after performing the user authentication is the same as the display process in the case of performing the screen transition from the common home screen 230. In this case, the registered value function list screen 250 displayed at Step S107 displays the registered value icons corresponding to the registered values registered in the user function table for the authenticated user. The registered value function list screen 260 displayed at Step S108 also displays the registered value buttons corresponding to the registered values registered in the user function table for the authenticated user.

Figure 12:
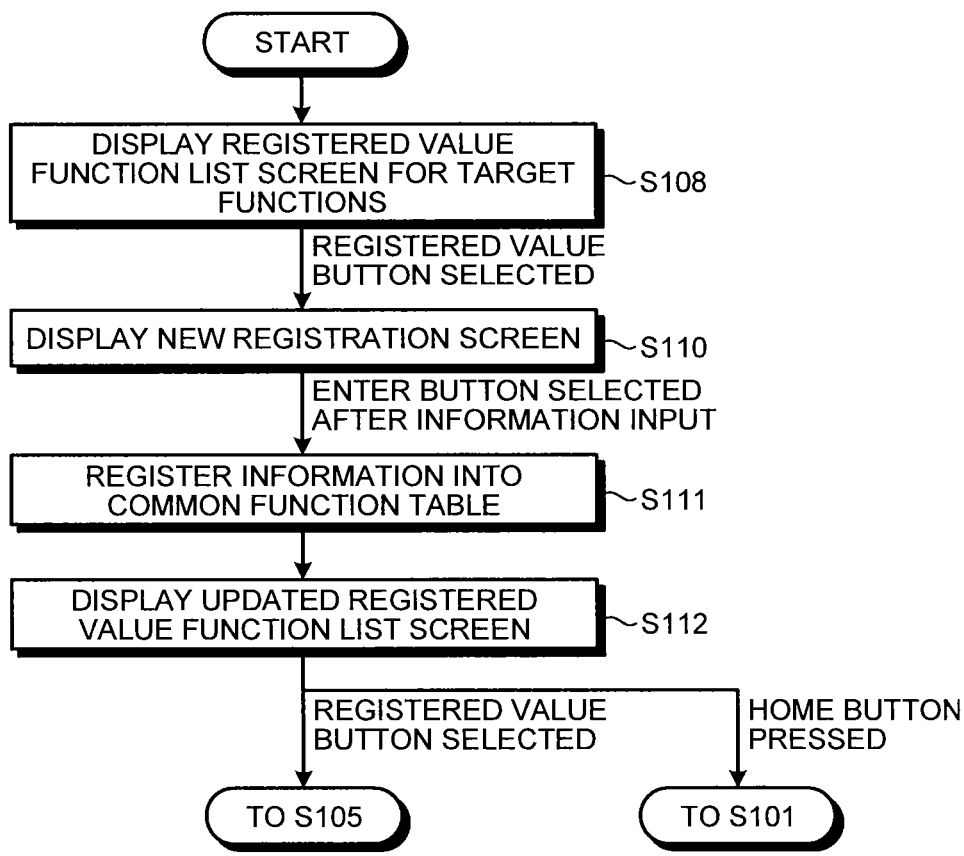
FIG. 12 is a flowchart illustrating a new registration process performed by the image processing apparatus 100.
Figure 13A:
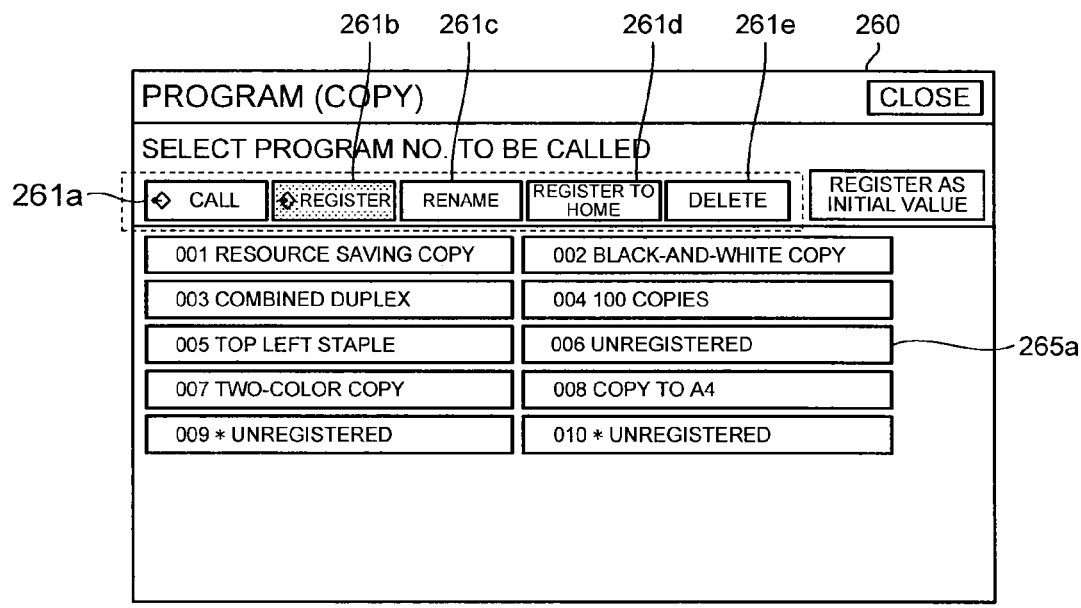
FIG. 13A is a diagram illustrating a screen displayed on the touch panel 130 in the new registration process.
Figure 13B:
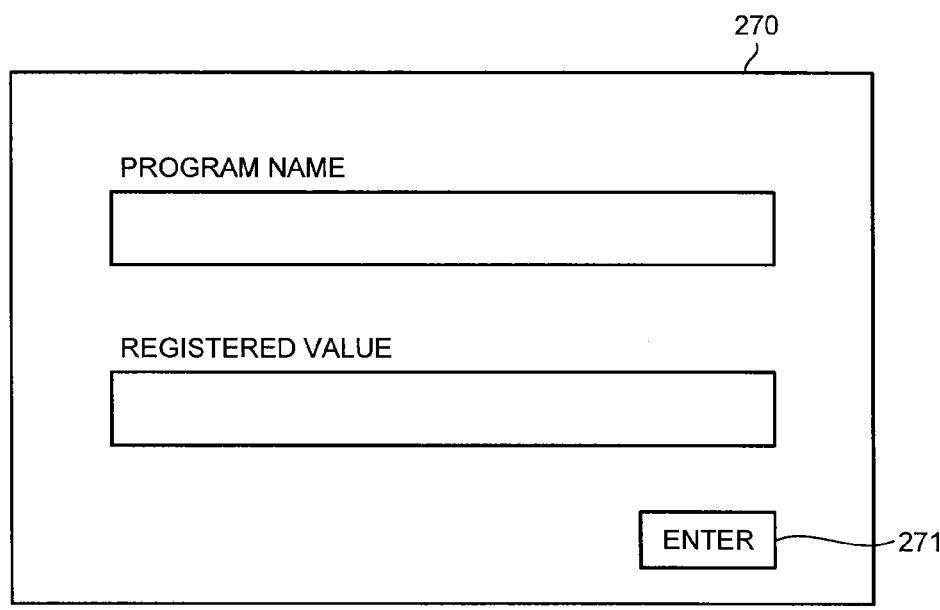
FIG. 13B is a diagram illustrating a screen displayed on the touch panel 130 in the new registration process.
Figure 13C:
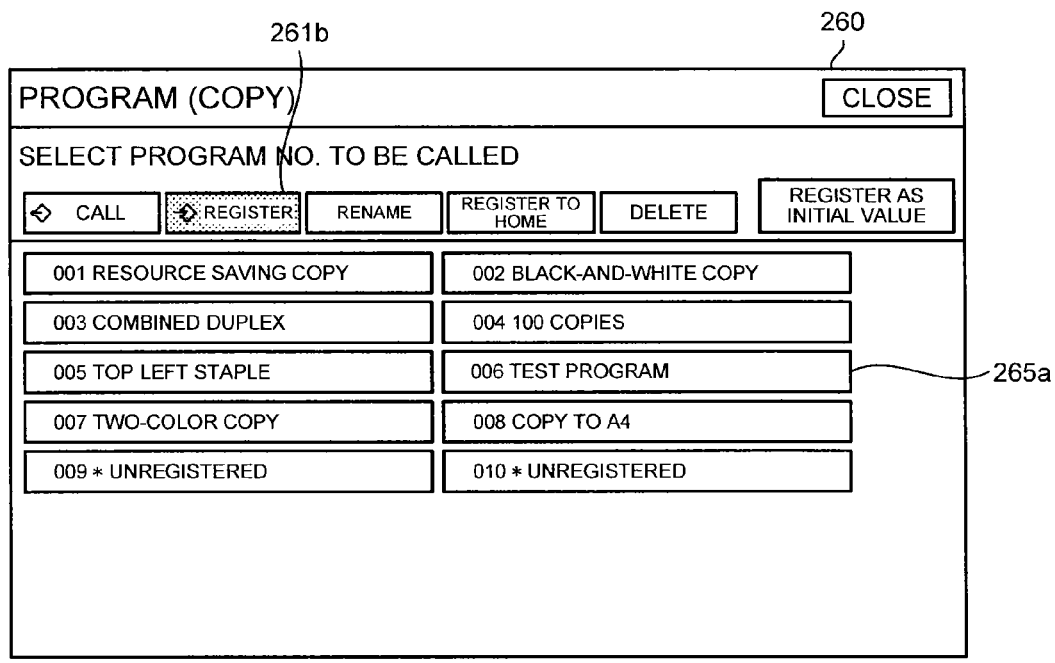
FIG. 13C is a diagram illustrating a screen displayed on the touch panel 130 in the new registration process.

Next, a description will be made of a new registration process in the case of setting a new registered value in the common function table 141 according to an input from the user. FIG. 12 is a flowchart illustrating the new registration process performed by the image processing apparatus 100. FIGS. 13A to 13C are diagrams illustrating screens displayed on the touch panel 130 in the new registration process illustrated in FIG. 12.

First, the user performs the input operations in the display process described in FIG. 7 to display, at Step S108 illustrated in FIG. 7, the registered value function list screen 260 for a function for which the user desires to register a new registered value on the touch panel 130. As illustrated in FIG. 13A, if the user selects the register button 261b out of the purpose selection buttons while the registered value function list screen 260 is displayed, the register button 261b is displayed in a different color from that of other buttons. After the user further selects a registered value button attached with a desired number on the registered value function list screen 260, the display processing unit 103 displays on the touch panel 130 a new registration screen 270 illustrated in FIG. 13B (Step S110). In the example illustrated in FIGS. 13A to 13C, a registered value button 265a is selected.

Next, after the user enters, into the common function table 141, pieces of information to be registered, and then selects an enter button 271, the registration unit 104 registers the entered information in the common function table 141 (Step S111). On the new registration screen 270, the information entered from the user and registered in the common function table 141 includes, for example, registered values, registered value IDs, and names of functions to which registered values have been set. These pieces of new registered information are registered in the common function table 141 in a corresponding manner to the same registered value ID as the number given to the registered value button selected by the user on the registered value function list screen 260. In other words, the registration unit 104 serves as a registered value registration unit and a name registration unit.

In the example illustrated in FIGS. 13A to 13C, the new registered information is registered in the common function table 141 in a corresponding manner to the registered value ID "006" that is the same as the number "006" for the registered value button 265a.

Furthermore, the display processing unit 103 displays on the touch panel 130 the updated registered value function list screen 260 reflecting the new registration (Step S112). Thus, the new registration process is terminated. If the user selects a registered value button on the updated registered value function list screen 260, the process proceeds again to Step S105 described with reference to FIG. 7. On the other hand, if the user presses the home key 121 while the updated registered value function list screen 260 is displayed, the process proceeds again to Step S101 described with reference to FIG. 7.

FIG. 13C is a diagram illustrating the registered value function list screen 260 after the new registration. If a name "test program" is entered on the new registration screen 270 illustrated in FIG. 13B, a text "Test Program" is displayed at a registered value button 265b numbered "006" on the registered value function list screen 260 illustrated in FIG. 13C.

Figure 14:
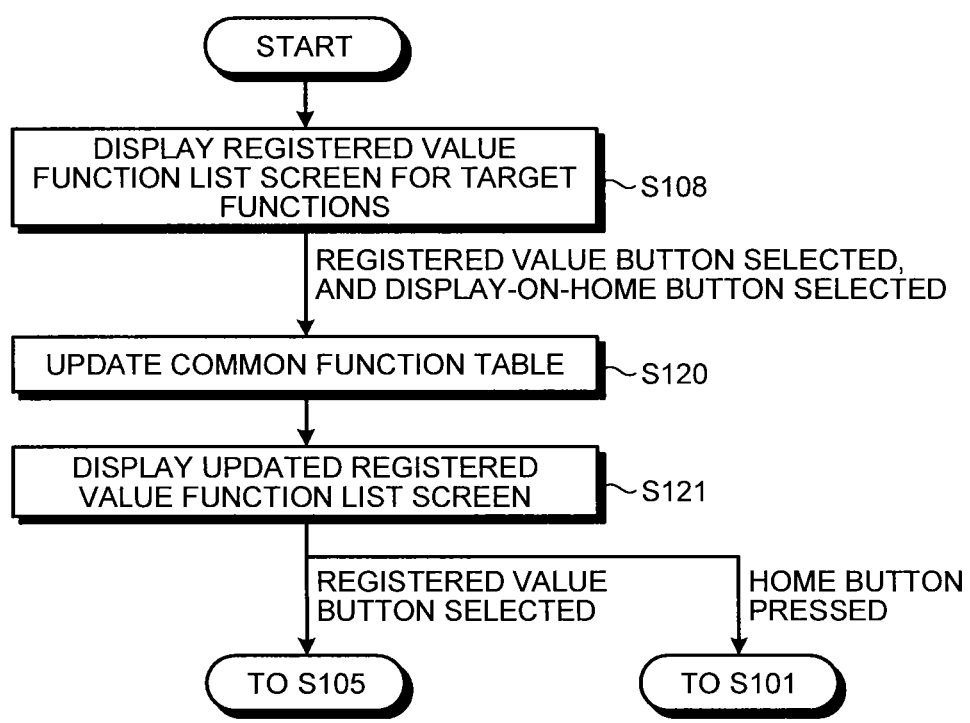
FIG. 14 is a flowchart illustrating an update process of updating display on the home screen.
Figure 15A:
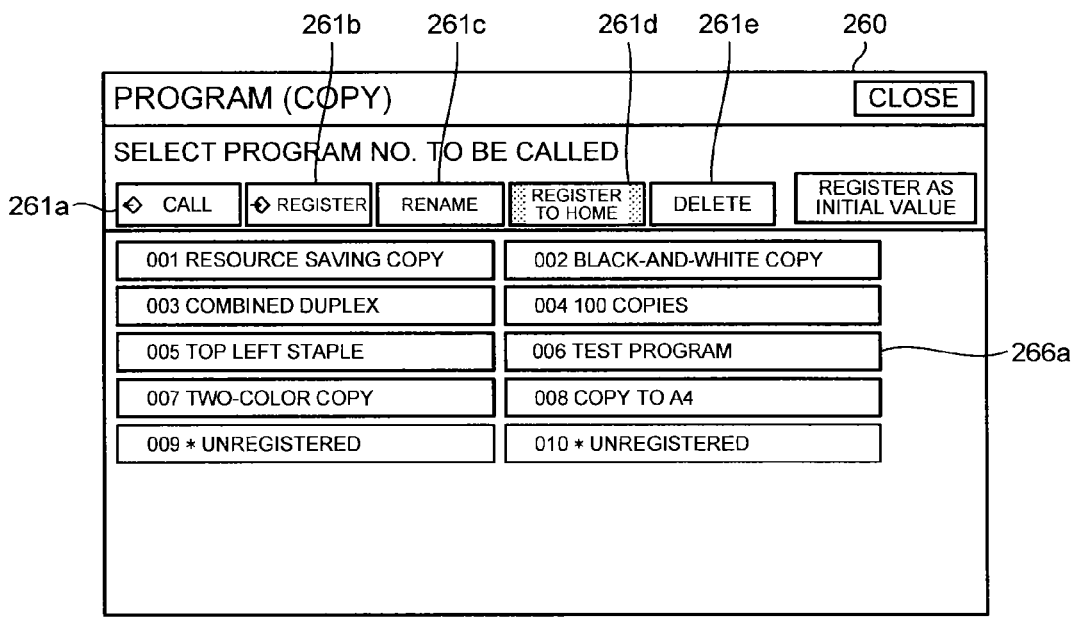
FIG. 15A is a diagram illustrating a screen displayed on the touch panel 130 in the update process illustrated in FIG. 14.
Figure 15B:
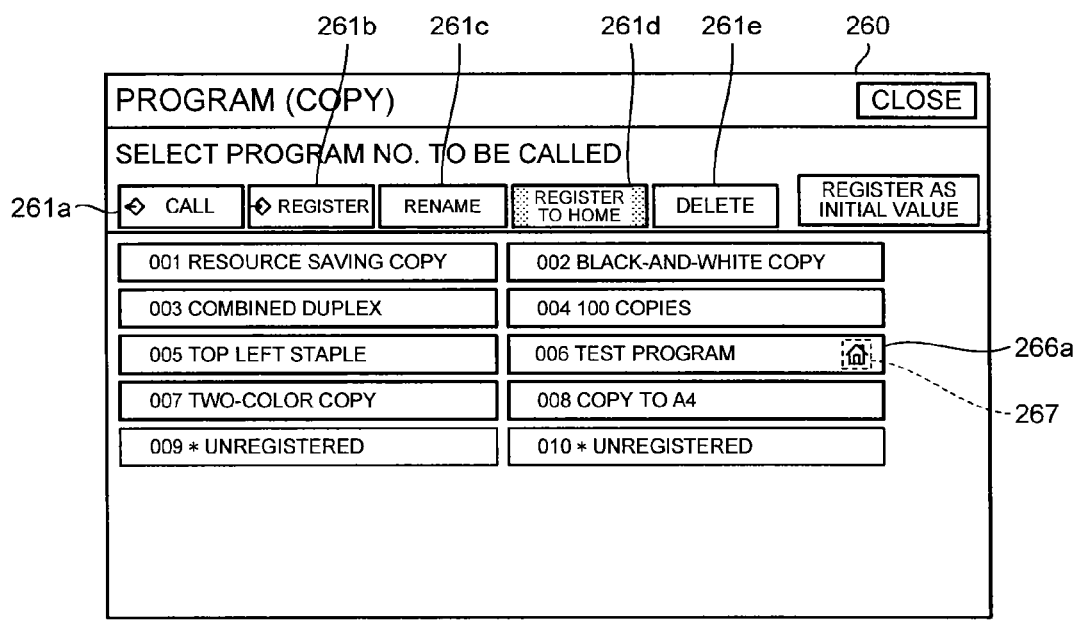
FIG. 15B is a diagram illustrating a screen displayed on the touch panel 130 in the update process illustrated in FIG. 14.
Figure 16:
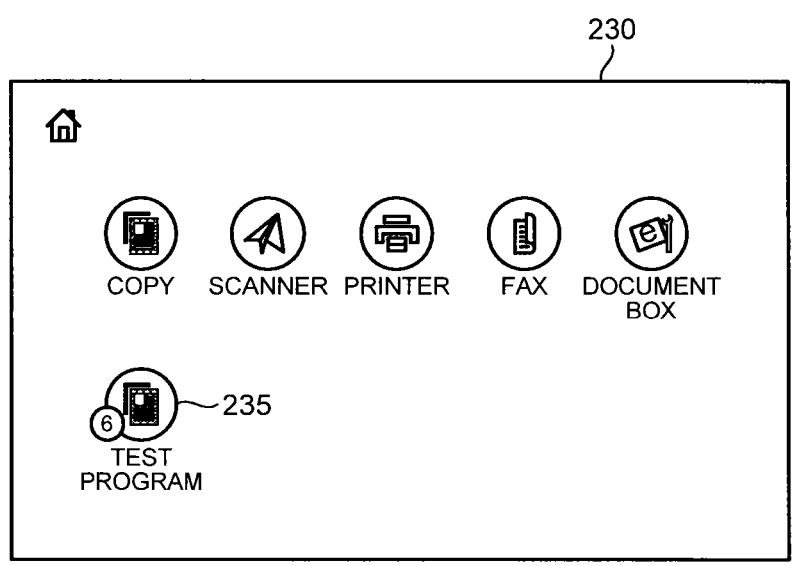
FIG. 16 is a diagram illustrating a screen displayed on the touch panel 130 in the update process illustrated in FIG. 14.

Next, a description will be made of an update process of the common function table 141 performed by the image processing apparatus 100. FIG. 14 is a flowchart illustrating the update process in which the image processing apparatus 100 updates display on the home. FIGS. 15A, 15B, and 16 are diagrams each illustrating a screen displayed on the touch panel 130 in the update process illustrated in FIG. 14.

First, in the same manner as in the new registration process, the registered value function list screen 260 for a function to be subjected to update is displayed on the touch panel 130 at Step S108 in FIG. 7. If the user selects a registered value button to be updated and further selects the display-to-home button 261d, the update unit 105 changes the necessity of the display on the home screen corresponding to the selected registered value button to "Yes" in the common function table 141. That is, the update unit 105 updates the common function table 141 according to the input from the user accepted by the accepting unit 101 (Step S120).

Furthermore, the display processing unit 103 refers to the updated common function table 141, and then displays the registered value function list screen 260 reflecting the updated common function table 141 (Step S121). If the user selects a registered value button on the updated registered value function list screen 260, the process proceeds again to Step S105 described with reference to FIG. 7. On the other hand, if the user presses the home key 121 while the updated registered value function list screen 260 is displayed, the process proceeds again to Step S101 described with reference to FIG. 7.

Assume that the user selects a registered value button 266a of "006 Test Program", and further selects the display-to-home button 261d on the registered value function list screen 260 illustrated in FIG. 15A. In this case, the update unit 105 changes the necessity of the display on the home screen corresponding to the registered value ID "006" to "Yes" in the common function table 141. According to this change, the display processing unit 103 attaches a home image 267 to the registered value button 266a of "006 Test Program" on the registered value function list screen 260, as illustrated in FIG. 15B. Furthermore, the display processing unit 103 newly adds a test program icon 235 to the common home screen 230 as illustrated in FIG. 16.

Figure 17:
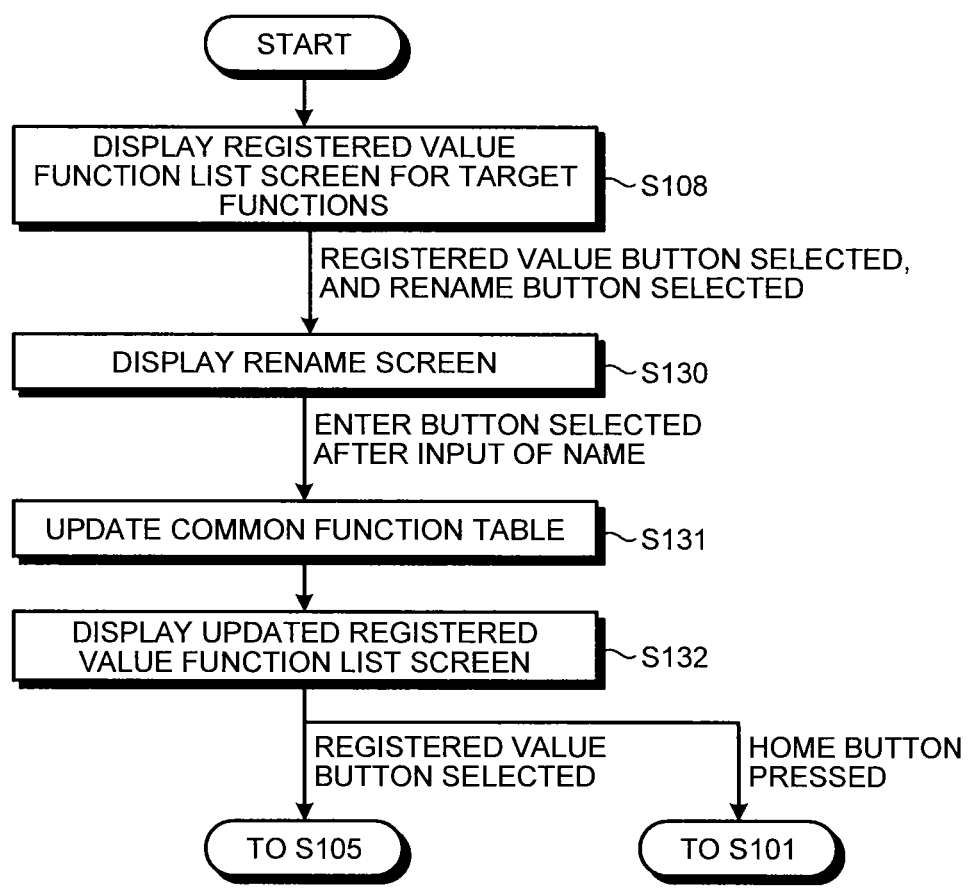
FIG. 17 is a flowchart illustrating an update process for changing a name of a registered function.

FIG. 17 is a flowchart illustrating the update process for changing a name of a registered function by the image processing apparatus 100. If the user selects a registered value button to be updated and further selects the rename button 261c on the registered value function list screen 260, the display processing unit 103 displays a rename screen (not illustrated) on the touch panel 130 (Step S130). The rename screen displays an entry field for entering a name and an enter button as are displayed on the new registration screen 270 illustrated in FIG. 13B.

After the user enters the name and then selects the enter button on the rename screen, the update unit 105 changes the name registered in the common function table 141 to the name entered by the user. That is, the common function table 141 is updated (Step S131). Furthermore, the display processing unit 103 displays the updated registered value function list screen 260 (Step S132). The updated registered value function list screen 260 displays the name after being renamed for the registered value button selected by the user. If the user selects a registered value button on the updated registered value function list screen 260, the process proceeds again to Step S105 described with reference to FIG. 7. On the other hand, if the user presses the home key 121 while the updated registered value function list screen 260 is displayed, the process proceeds again to Step S101 described with reference to FIG. 7.

Figure 18:
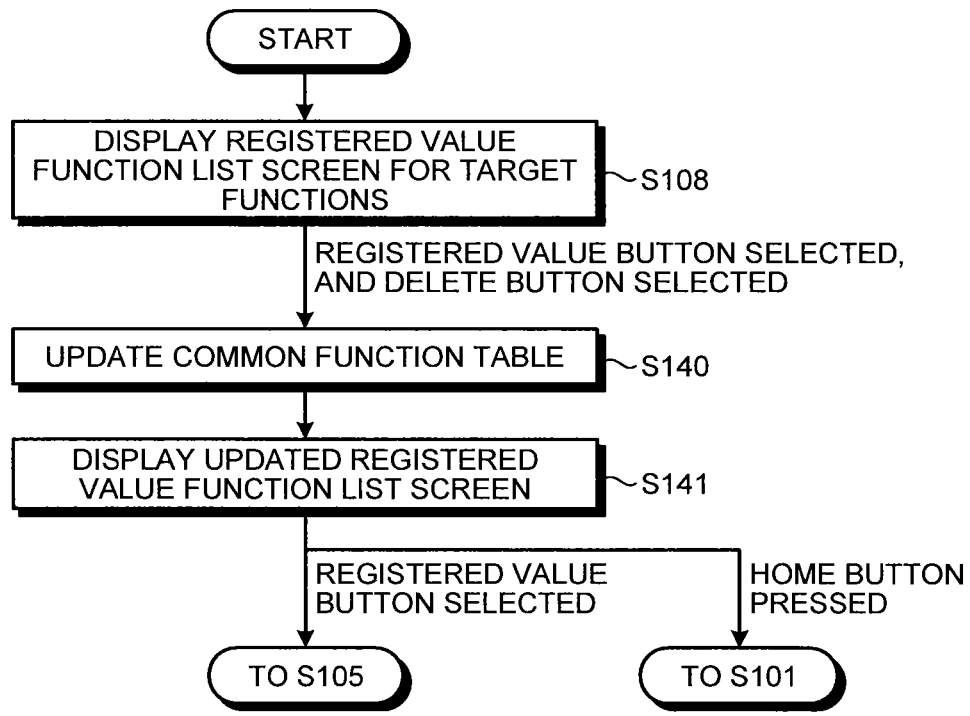
FIG. 18 is a flowchart illustrating a deletion process for deleting a registered function by the image processing apparatus 100.

FIG. 18 is a flowchart illustrating a deletion process for deleting a registered function by the image processing apparatus 100. If the user selects a registered value button to be deleted and further selects the delete button 261e on the registered value function list screen 260, the update unit 105 deletes from the common function table 141 the information on the registered values corresponding to the registered value button selected by the user. That is, the common function table 141 is updated (Step S140). In other words, the update unit 105 serves as a registered value deletion unit. Furthermore, the display processing unit 103 displays the updated registered value function list screen 260 (Step S141). The updated registered value function list screen 260 displays "Unregistered" indicating that no function is registered at the registered value button corresponding to the registered function deleted by instruction from the user. If the user selects a registered value button on the updated registered value function list screen 260, the process proceeds again to Step S105 described with reference to FIG. 7. On the other hand, if the user presses the home key 121 while the updated registered value function list screen 260 is displayed, the process proceeds again to Step S101 described with reference to FIG. 7.

Figure 19:
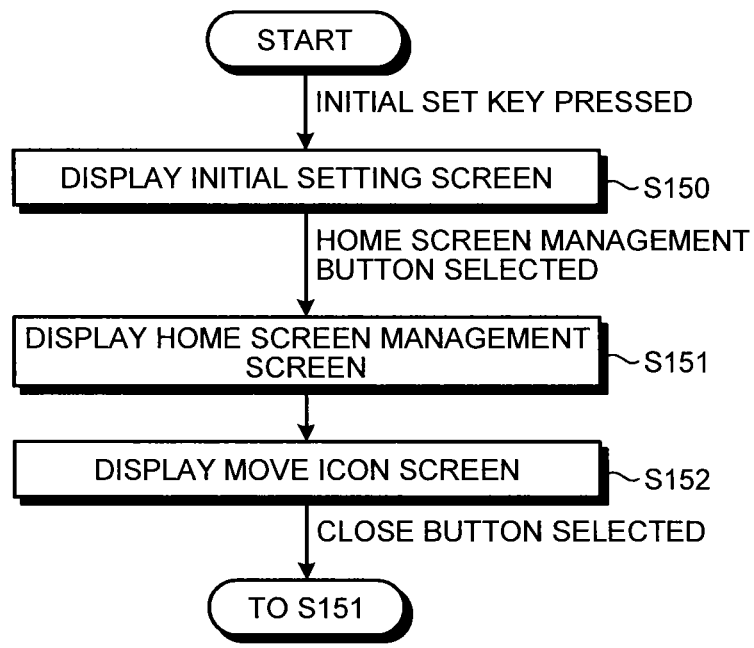
FIG. 19 is a flowchart illustrating an arrangement change process performed by the image processing apparatus 100.

In the image processing apparatus 100 according to the present embodiment, the arrangement of the registered value icons and the initial value icons displayed on the common home screen 230 can also be changed by input from the user. FIG. 19 is a flowchart illustrating an arrangement change process performed by the image processing apparatus 100. FIGS. 20A to 20D are diagrams each illustrating a screen displayed on the touch panel 130 in the arrangement change process illustrated in FIG. 19.

Figure 20A:
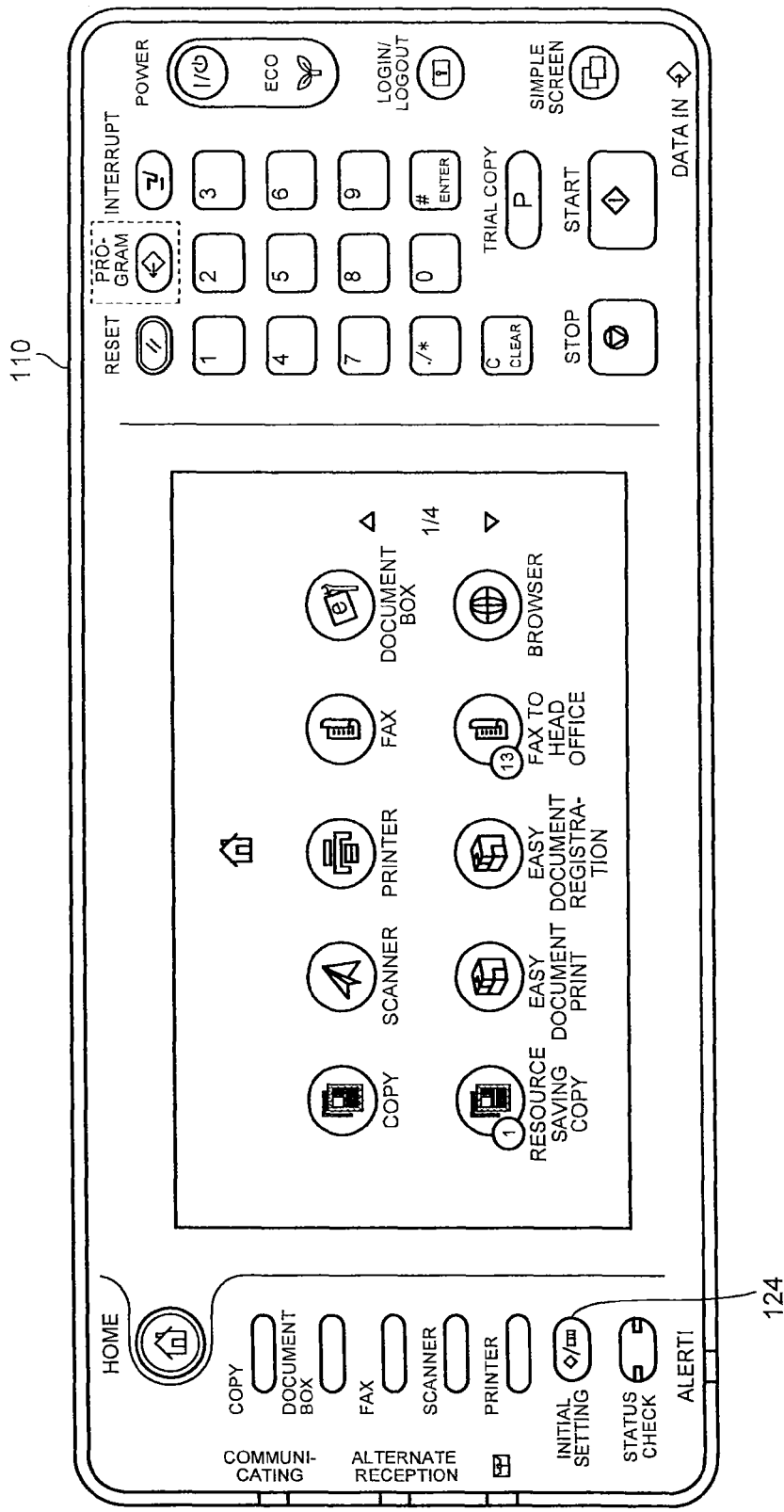
FIG. 20A is a diagram illustrating a screen displayed on the touch panel 130 in the arrangement change process illustrated in FIG. 19.
Figure 20B:
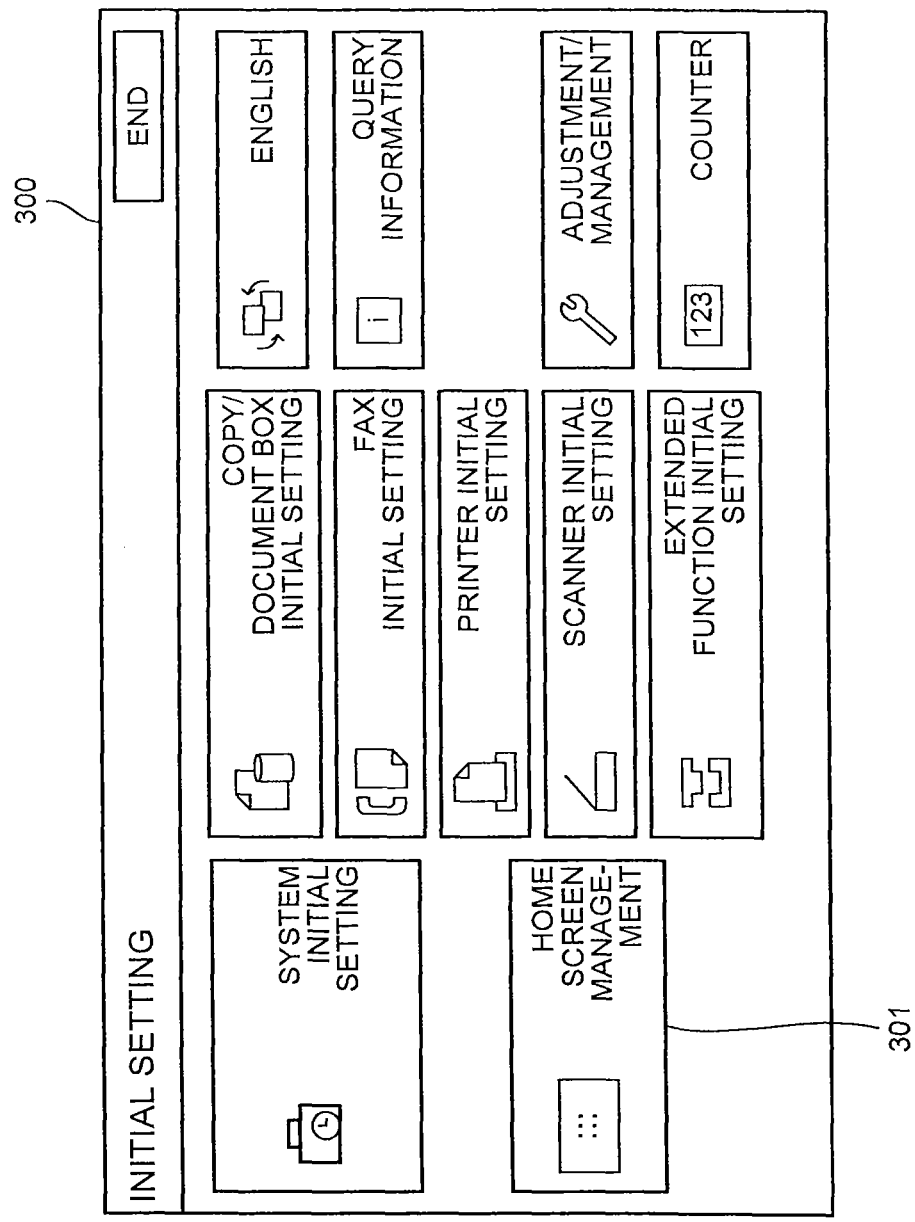
FIG. 20B is a diagram illustrating a screen displayed on the touch panel 130 in the arrangement change process illustrated in FIG. 19.
Figure 20C:
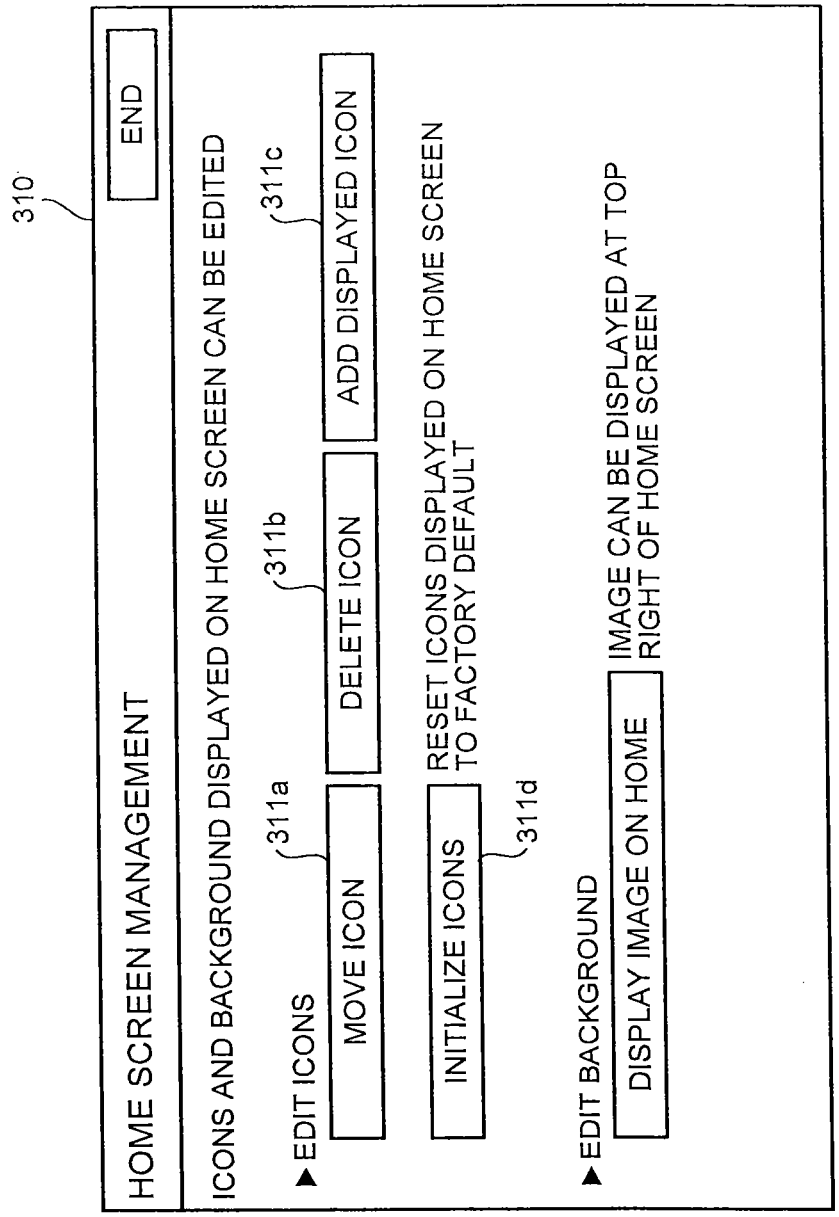
FIG. 20C is a diagram illustrating a screen displayed on the touch panel 130 in the arrangement change process illustrated in FIG. 19.

When performing the arrangement change, the user presses the initial set key 124 illustrated in FIG. 20A. Accordingly, the display processing unit 103 displays an initial setting screen 300 illustrated in FIG. 20B on the touch panel 130 (Step S150). If the user selects a "Home Screen Management" button 301 on the initial setting screen 300, the display processing unit 103 displays a home screen management screen 310 illustrated in FIG. 20C (Step S151). The home screen management screen 310 displays a "Move Icon" button 311a, a "Delete Icon" button 311b, an "Add Displayed Icon" button 311c, and an "Initialize Icon" button 311d. The user can select these buttons to change the arrangement and the like of the icons displayed on the common home screen 230.

Figure 20D:
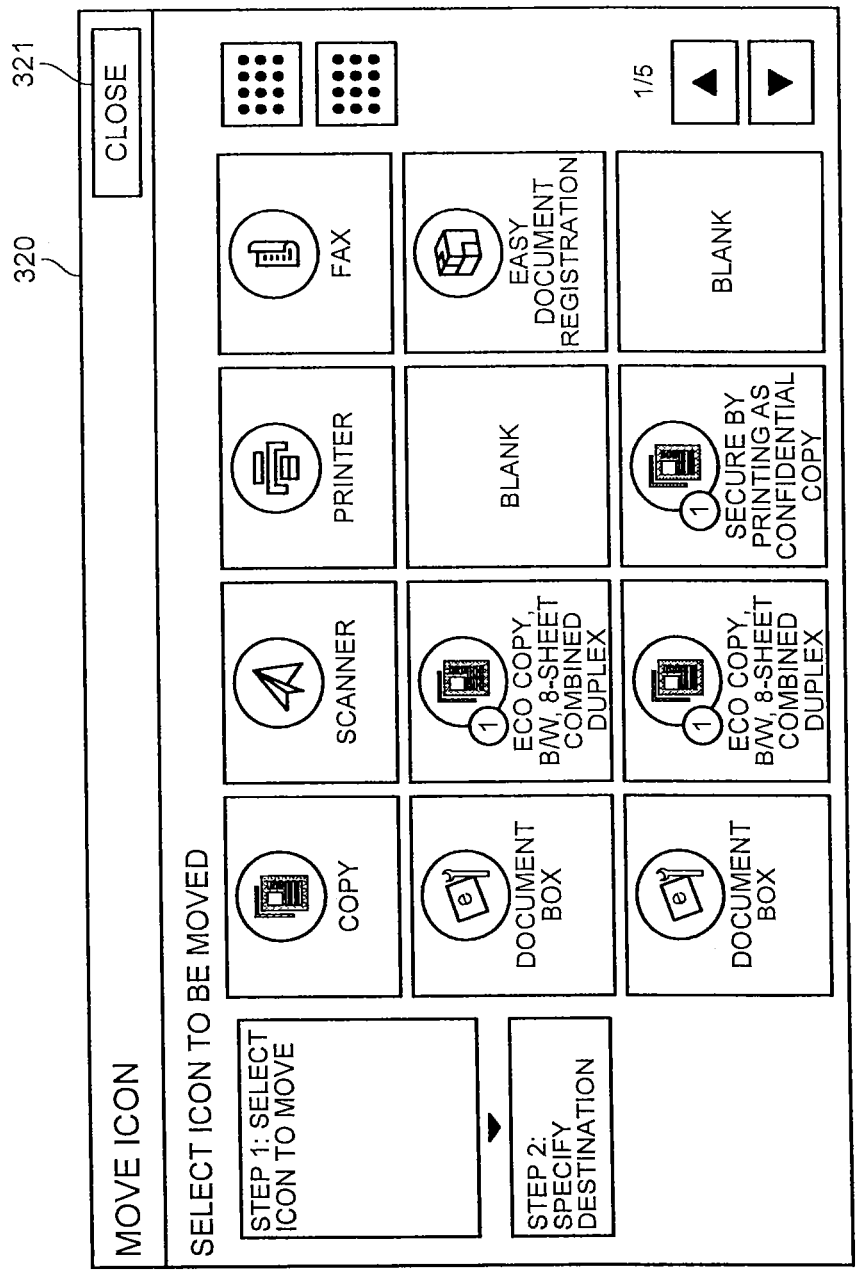
FIG. 20D is a diagram illustrating a screen displayed on the touch panel 130 in the arrangement change process illustrated in FIG. 19.

If the user selects the "Move Icon" button 311a on the home screen management screen 310, the display processing unit 103 displays a move icon screen 320 illustrated in FIG. 20D on the touch panel 130 (Step S152). On the move icon screen 320, the user can enter a desired specification to change the arrangement position of each icon. According to the input from the user accepted by the accepting unit 101, the update unit 105 changes the display position corresponding to the registered values or the initial values that is to be moved. Here, the update unit 105 serves as a display position update unit. If the user further selects a close button 321 displayed on the move icon screen 320, the process proceeds to Step S151, and the display of the touch panel 130 returns to the home screen management screen 310.

FIGS. 21A to 21E are diagrams for explaining transition of screens displayed on the touch panel 130 by the display processing unit 103 according to user operations on the move icon screen 320.

If the user selects an icon to be moved on the move icon screen 320 illustrated in FIG. 21A, the background of the selected icon is displayed in a different color from that of the other icons' background. In addition, the selected icon is displayed in a step 1 display area 322 provided on the left side of the move icon screen 320.

Figure 21B:
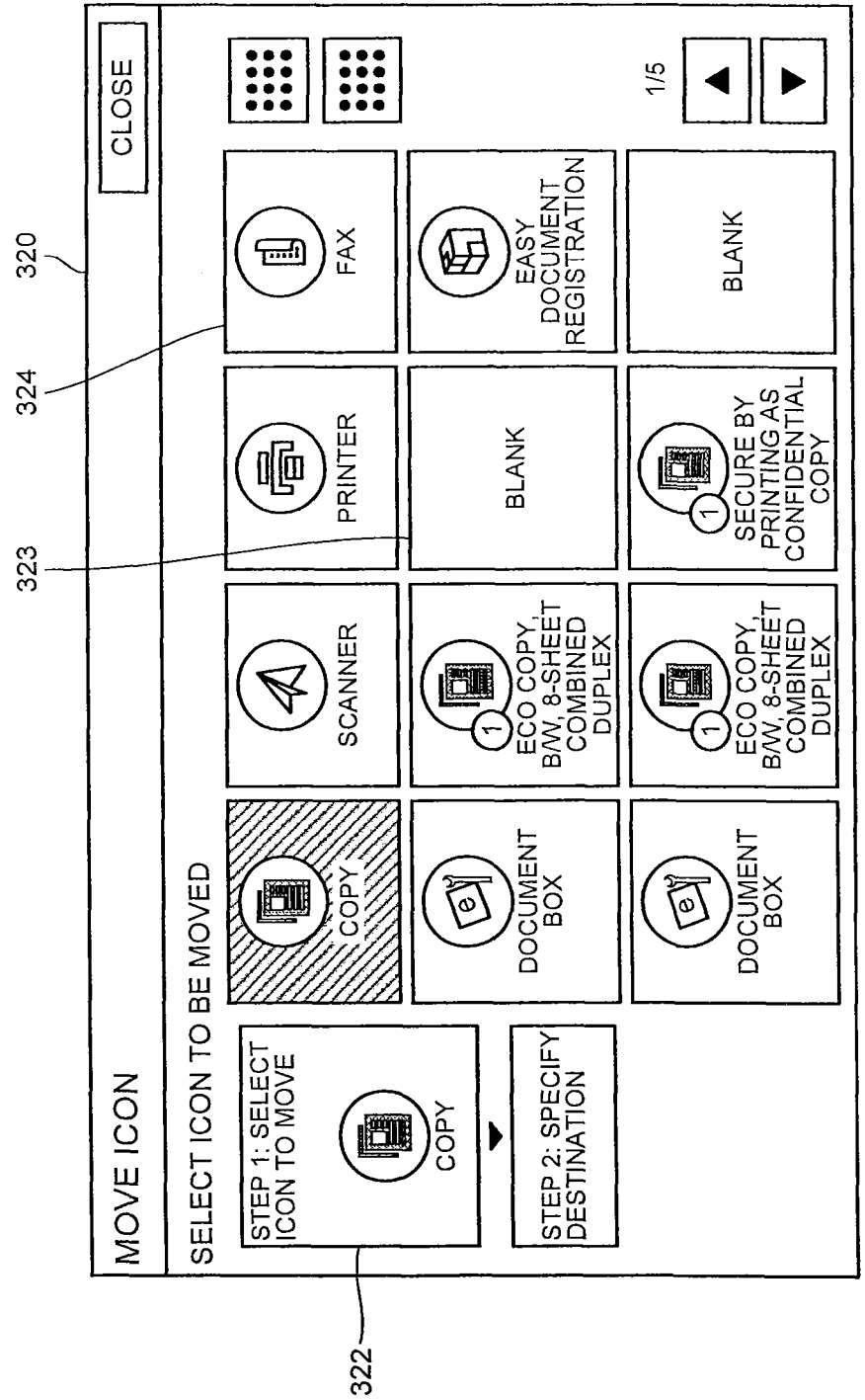
FIG. 21B is a diagram for explaining screen transition on the move icon screen 320.

If the user selects the copy icon on the move icon screen 320 of FIG. 21A, the background of the copy icon is displayed in a different color from that of the other icons' background, and in addition, the copy icon is displayed in the step 1 display area 322, as illustrated in FIG. 21B. Accordingly, the user can check which icon is selected as an icon to be moved.

Figure 21C:
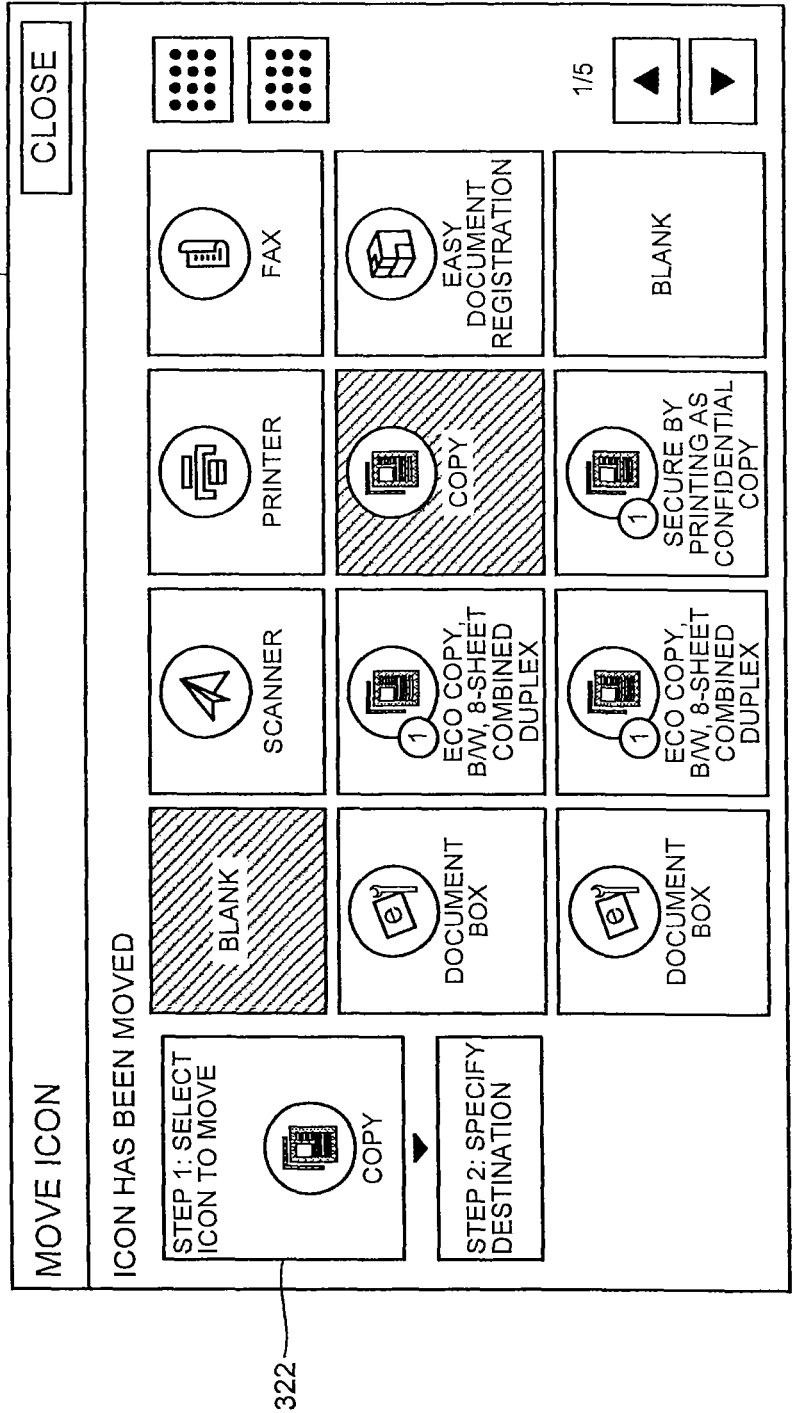
FIG. 21C is a diagram for explaining screen transition on the move icon screen 320.

Next, on the move icon screen 320 of FIG. 21B, the user selects a display position to which the selected icon is to be moved. Assume, for example, that a blank area 323 displaying no icon is selected as the destination of movement in FIG. 21B. In this case, as illustrated in FIG. 21C, the icon selected to be moved is disposed at the destination of movement. In addition, as illustrated in FIG. 21C, on the move icon screen 320, in order to allow the user to understand which icon is moved, the background of the moved icon is displayed in a different color from that of the other icons' background.

Note that, on the move icon screen 320 of FIG. 21B, if, for example, the display position of a fax icon 324 is selected as the destination of movement, that is, if an icon has been displayed in the destination display position, the display processing unit 103 displays a confirmation screen 330 illustrated in FIG. 21D. In the case of moving an icon to be moved to the destination of movement thereof when another icon has been already arranged at the destination of movement, the icon at the destination of movement is also moved to the position of the icon to be moved. Therefore, as mentioned above, the confirmation screen 330 is displayed for prompting the user to confirm that the two icons' display positions will be changed.

Figure 21E:
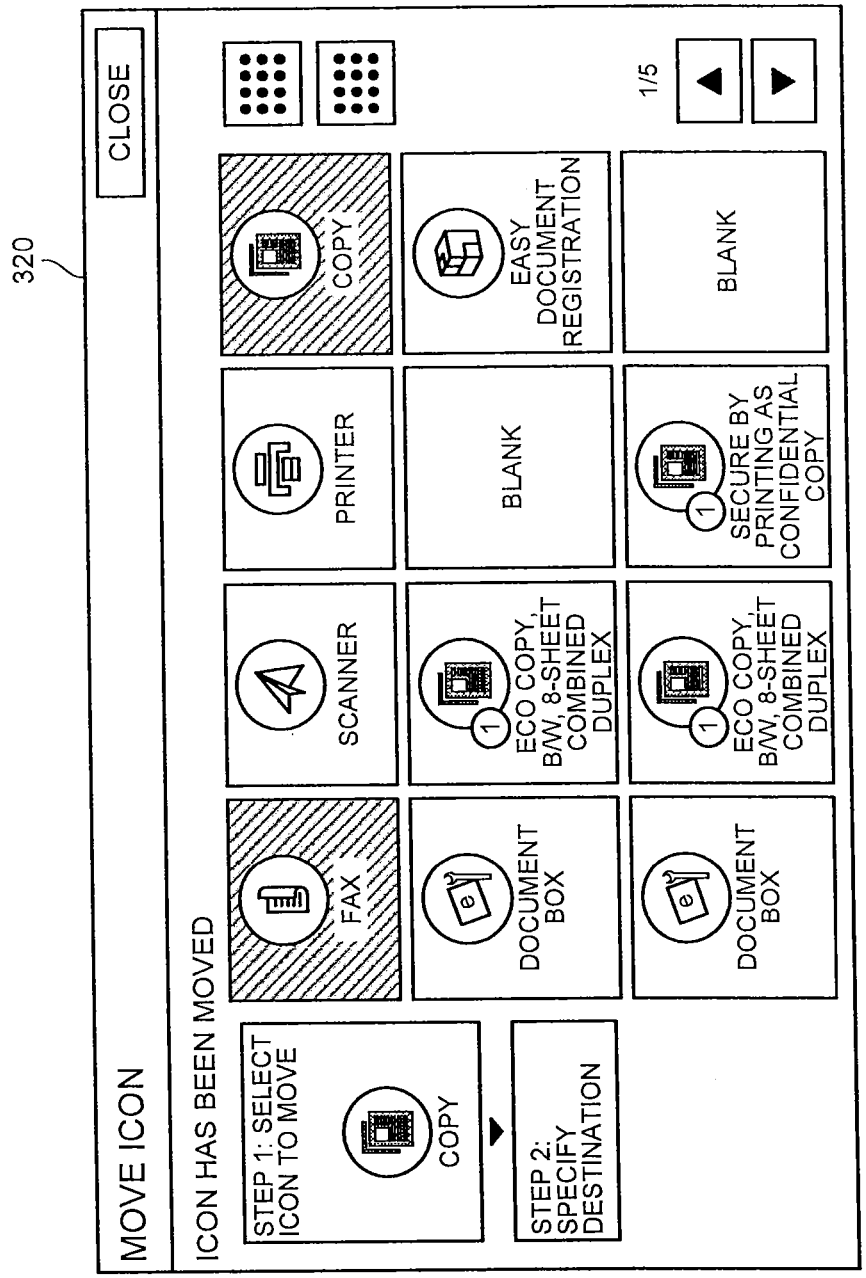
FIG. 21E is a diagram for explaining screen transition on the move icon screen 320.
Figure 22:
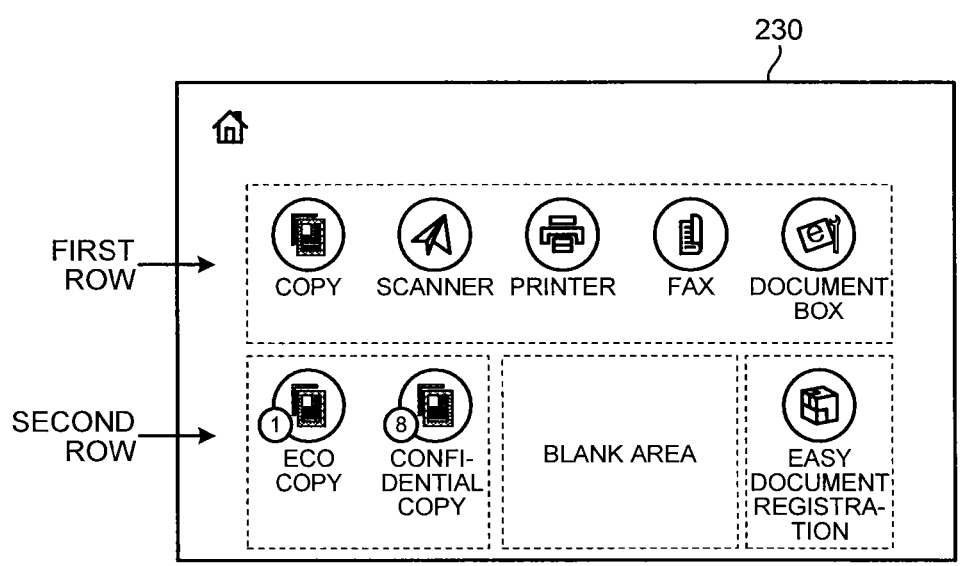
FIG. 22 is a diagram illustrating an example of grouping of icons.

If the user selects an OK button 331 on the confirmation screen 330, the display processing unit 103 swaps the display positions between the icon to be moved and the icon at the destination of movement, as illustrated in FIG. 21E. On the other hand, if the user selects a cancel button 332 on the confirmation screen 330, the process returns to the move icon screen 320 of FIG. 21B.

In this manner, the user can change the arrangement of icons displayed on the common home screen 230 with a simple operation. Moreover, blank areas are arranged in addition to icons. Therefore, the icons can be displayed in a grouped manner by arranging the blank areas as appropriate.

The blank areas are inserted in the home screen based on input from the user. That is, the accepting unit 101 accepts an instruction entered from the user to insert a blank area, and the registration unit 104 follows the insert instruction to register blank identification information for identifying the blank area into the function ID in the common function table 141, and to register a display position specified as the blank area in a corresponding manner to the blank identification information. The display processing unit 103 refers to the common function table 141, and displays the blank area in the display position corresponding to the blank identification information.

FIGS. 22, 23A, 23B, and 24A to 24C are diagrams illustrating examples of grouping of icons. In the example illustrated in FIG. 22, icons for functions to which initial values have been set, icons for functions to which registered values registered by the user have been set, and the icon for the SDK are arranged on the common home screen 230 consisting of one page. The icons corresponding to initial values are arranged in the first row of the common home screen 230. The icons corresponding to registered values and the icon for the SDK are arranged in the second row. A blank area is disposed between the area including the icons corresponding to registered values and the area including with the icon for the SDK. In this manner, different types of functions are arranged in separate rows, and in the same row, different types of functions are separately arranged using a blank area.

Figure 23A:
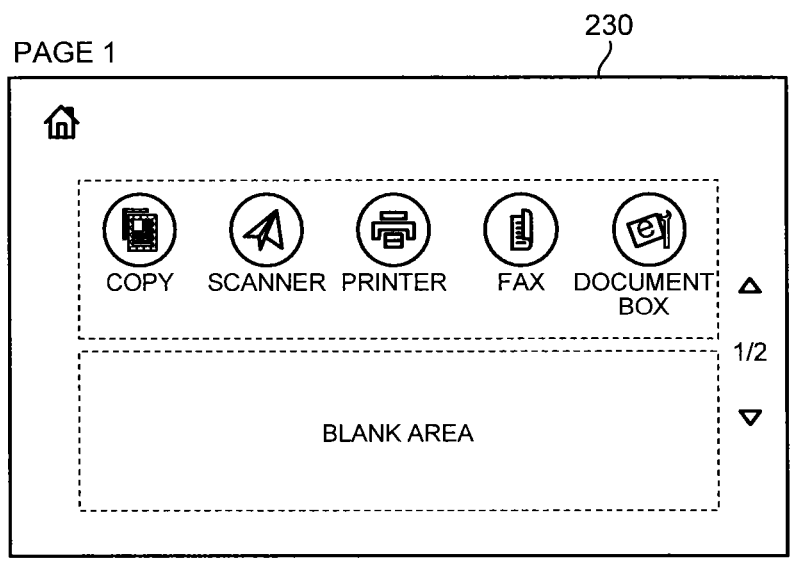
FIG. 23A is a diagram illustrating an example of the grouping of icons.
Figure 23B:
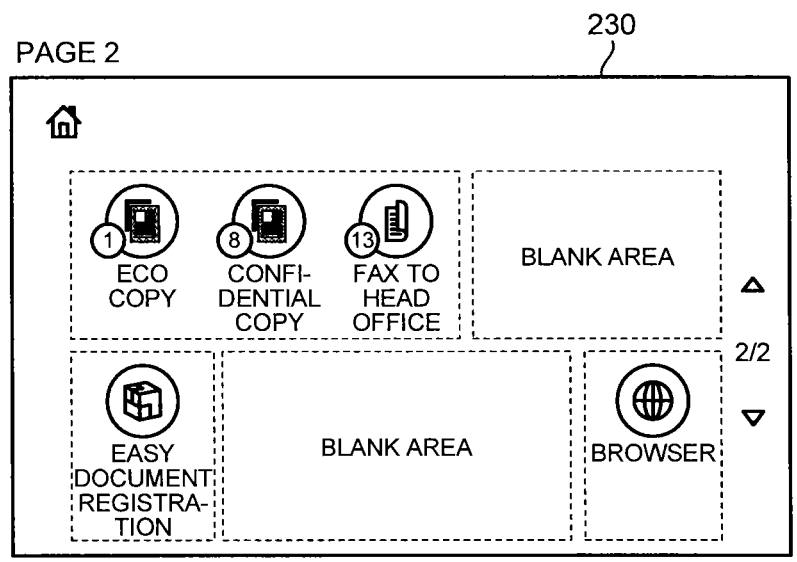
FIG. 23B is a diagram illustrating the example of the grouping of icons.

In the example illustrated in FIGS. 23A and 23B, the common home screen 230 consists of a plurality of pages, arranging icons corresponding to initial values on the first page and icons corresponding to registered values, the icon for the SDK, and the browser icon serving as an icon for a function provided by an external manufacturer on the second page. In this manner, in the example illustrated in FIGS. 23A and 23B, different types of functions are arranged on different pages.

Figure 24A:
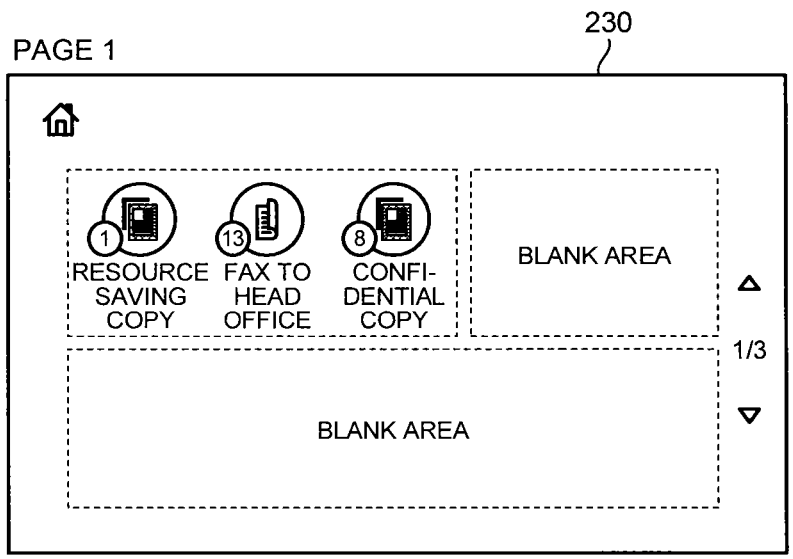
FIG. 24A is a diagram illustrating an example of the grouping of icons.
Figure 24B:
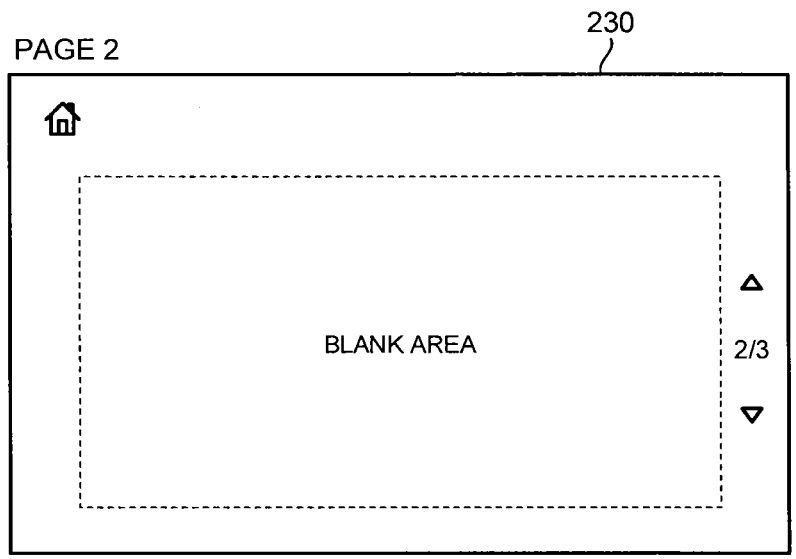
FIG. 24B is a diagram illustrating the example of the grouping of icons.
Figure 24C:
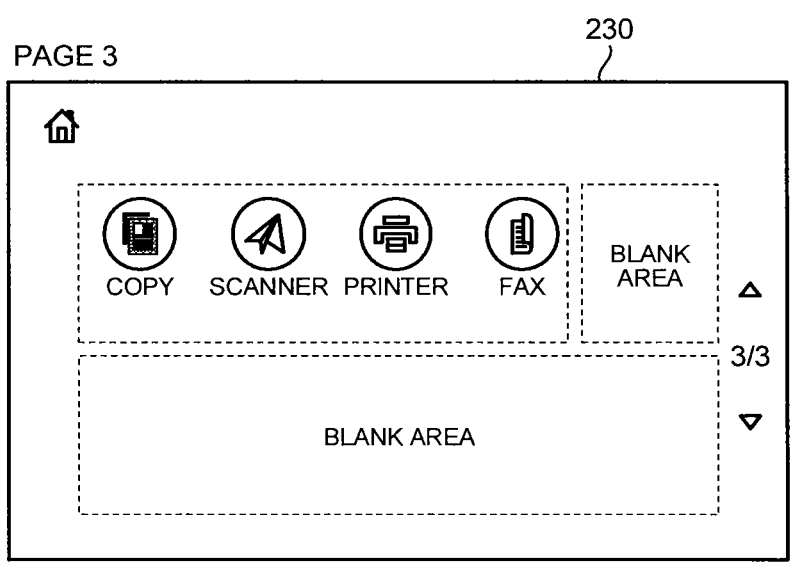
FIG. 24C is a diagram illustrating the example of the grouping of icons.

In the example illustrated in FIGS. 24A to 24C, frequently used icons are arranged on the first page while less frequently used icons are arranged on the third page, and the second page is arranged with a blank area. In this manner, it is possible to set an order of priority of icons based on frequency of use, and to arrange the icons according to the order of priority.

The grouping of icons and the insertion of blanks on the home screen may be performed according to input from the user as described above. In other examples, it is also possible that the image processing apparatus 100 stores therein in advance a rule for organizing icons on the home screen, and automatically rearranges the icons according to the rule when the user enters an instruction to apply the rule. In this case, the icons are grouped, for example, by insertion of blanks and/or by page breaks according to the preset rule, and displayed.

Figure 25A:
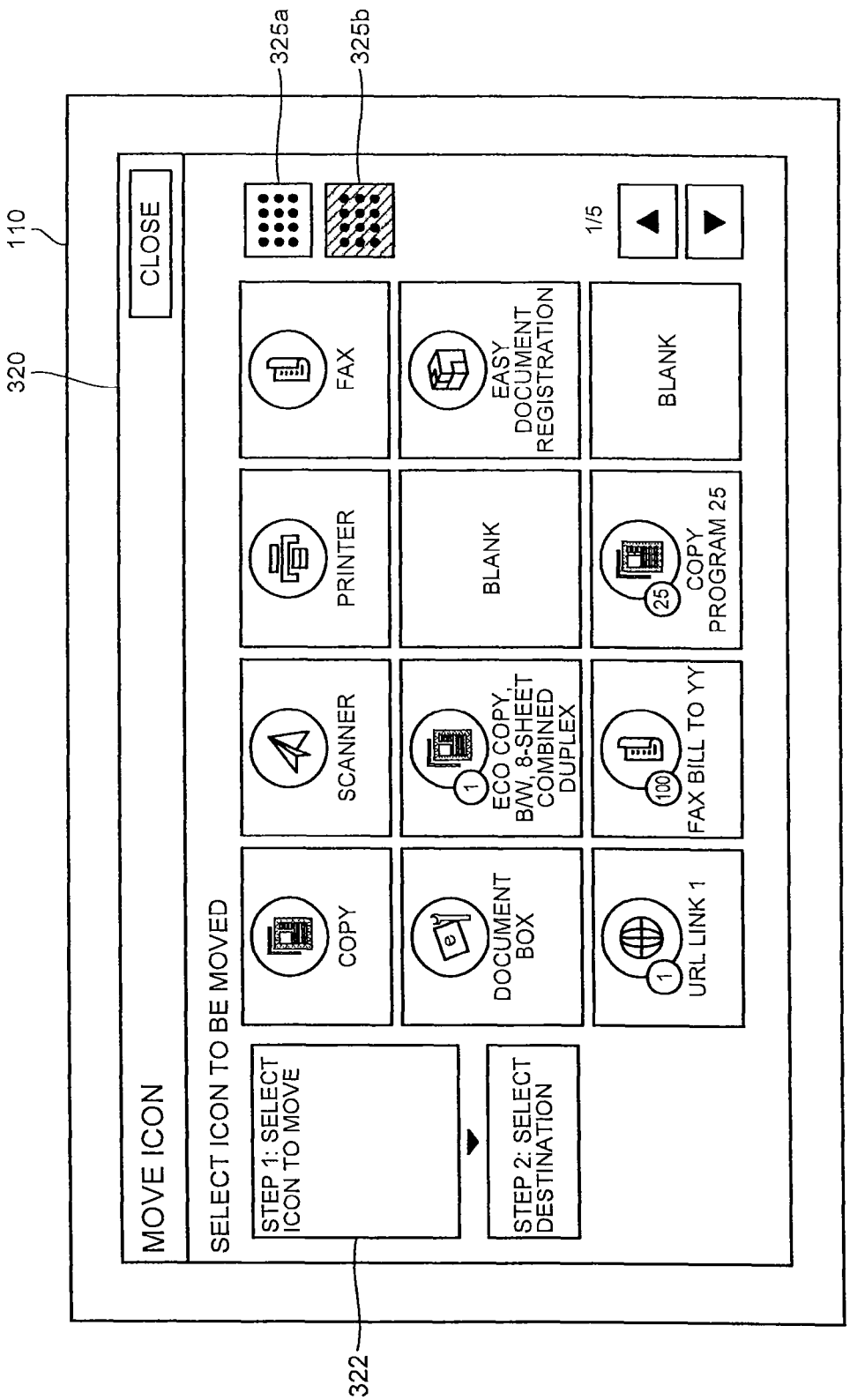
FIG. 25A is a diagram for explaining a display size change process.

Furthermore, on the move icon screen 320, a display size change process can be performed to change the number of icons and the size of characters displayed on the touch panel 130. As illustrated in FIG. 25A, arranged on the move icon screen 320 is switching buttons 325a and 325b, and the display processing unit 103 changes the number of icons and the size of characters if the user selects the switching button 325a or 325b, and the accepting unit 101 accepts the size change instruction.

The move icon screen 320 illustrated in FIG. 25A is in a state in which the switching button 325b is selected, and thus is a screen with a large number of icons and a small character size. The move icon screen 320 illustrated in FIG. 25B is in a state in which the switching button 325a is selected, and thus is a screen with a small number of icons and a large character size. The move icon screen 320 is interconnected with the common home screen 230, and thus, if the user presses the simple screen key 125 in the state illustrated in FIG. 25A or in the state illustrated in FIG. 25B, the accepting unit 101 accepts an instruction to display the home screen.

Figure 26A:
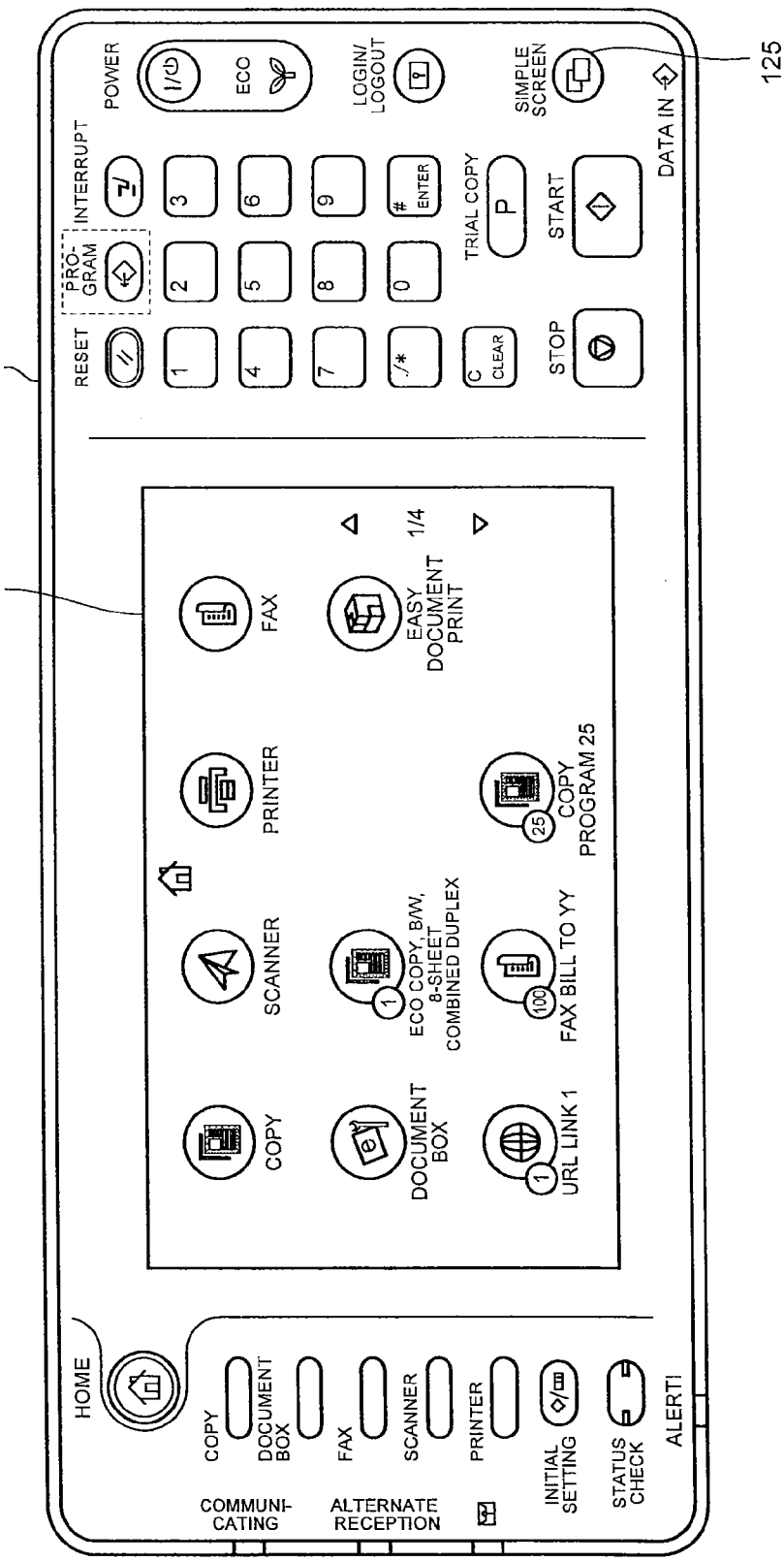
FIG. 26A is a diagram for explaining the display size change process.

If the simple screen key 125 is pressed in the state illustrated in FIG. 25A, the common home screen 230 with a large number of icons and a small character size is displayed as illustrated in FIG. 26A. If the simple screen key 125 is pressed in the state illustrated in FIG. 25B, the common home screen 230 with a small number of icons and a large character size is displayed as illustrated in FIG. 26B. Accordingly, it is possible to adjust the character size and so on, and also to adjust the arrangement positions of icons while checking the actual display of the common home screen 230.

In each of the display process described with reference to FIG. 7 and the like, the new registration process described with reference to FIG. 12 and the like, the update process described with reference to FIGS. 14, 17, 18, and the like, and the arrangement change process described with reference to FIG. 19 and the like, the description has been made above of the case of switching the screen from the common home screen 230 based on the premise of displaying the common home screen 230 without performing the user authentication. In the case of performing the user authentication and switching the screen from the user home screen 240, each process in the image processing apparatus 100 is the same as the process of the image processing apparatus 100 in the case of switching the screen from the common home screen 230.

Figure 27:
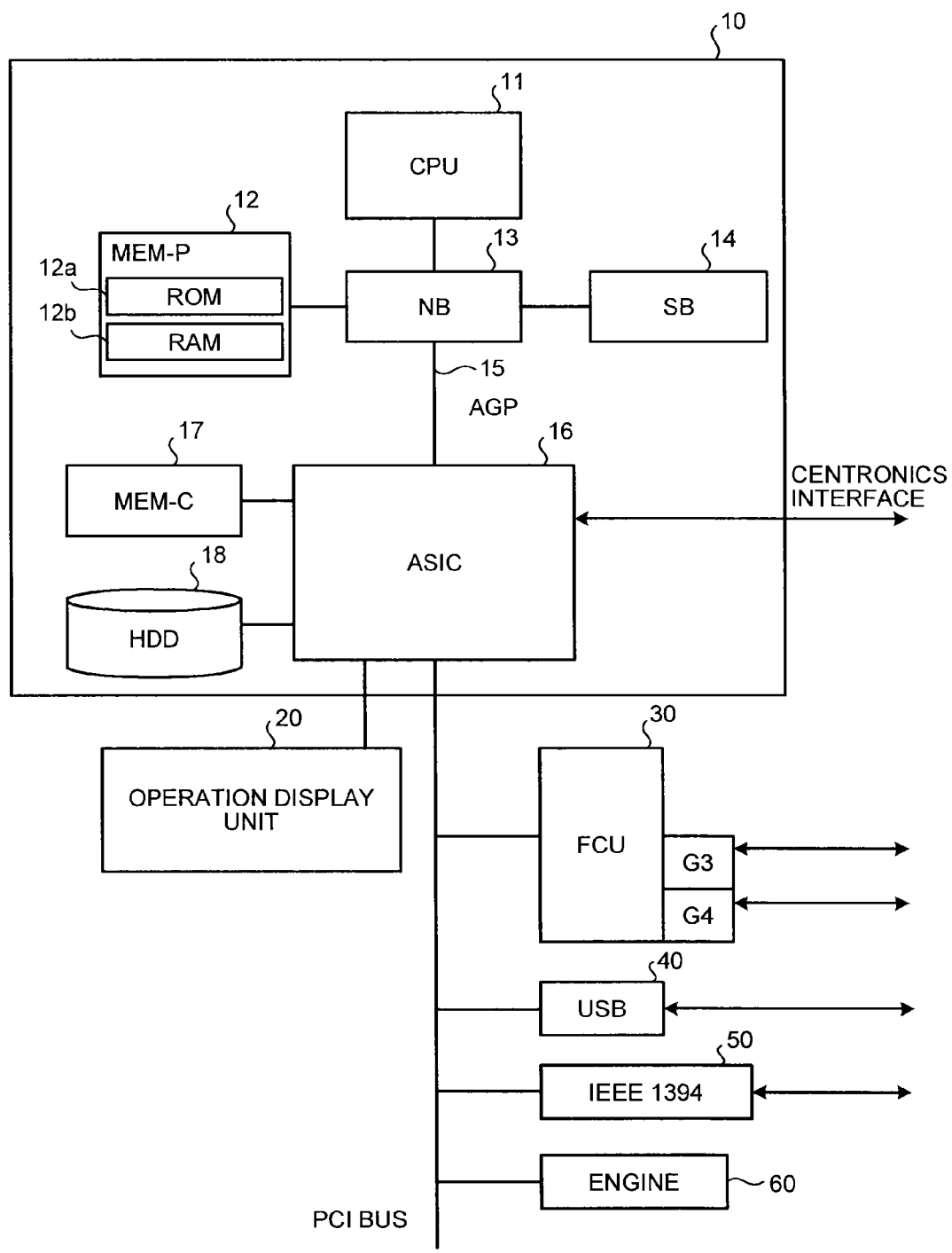
FIG. 27 is a diagram illustrating a hardware configuration of the image processing apparatus 100.

FIG. 27 is a block diagram illustrating a hardware configuration of the image processing apparatus 100 according to the embodiment. Using this diagram, a description will be made of the hardware configuration in which the image processing apparatus is an MFP. The MFP has a configuration in which a controller 10 is connected with an engine 60 via a peripheral component interconnect (PCI) bus. The controller 10 is a controller that controls the entire MFP, drawing, communication, and input from an operation unit (not illustrated). The engine 60 is, for example, a printer engine that is connectable to the PCI bus, and is, for example, a black-and-white plotter, a single-drum color plotter, a four-drum color plotter, a scanner, or a facsimile unit. This engine 60 includes, in addition to a so-called engine unit such as a plotter, a unit for image processing such as error diffusion and gamma transformation.

The controller 10 includes a CPU 11, a northbridge (NB) 13, a system memory (MEM-P) 12, a southbridge (SB) 14, a local memory (MEM-C) 17, an application-specific integrated circuit (ASIC) 16, and a hard disk drive (HDD) 18, and has a configuration in which an accelerated graphics port (AGP) bus 15 connects between the northbridge (NB) 13 and the ASIC 16. The MEM-P 12 further includes a read-only memory (ROM) 12a and a random access memory (RAM) 12b.

The CPU 11 performs overall control of the MFP, and has a chipset composed of the NB 13, the MEM-P 12, and the SB 14. The CPU 11 is connected to other devices via this chipset.

The NB 13 is a bridge for connecting the CPU 11 to the MEM-P 12, the SB 14, and the AGP bus 15. The NB 13 has a memory controller that controls read from and write to the MEM-P 12, and also has a PCI master and an AGP target.

The MEM-P 12 is a system memory that is used, for example, as a memory for storing therein computer programs and data, a memory for loading computer programs and data, and a memory for drawing by a printer, and is composed of the ROM 12a and the RAM 12b. The ROM 12a is a read-only memory that is used as a memory for storing therein computer programs and data, and the RAM 12b is a writable and readable memory that is used, for example, as a memory for loading computer programs and data and as a memory for drawing by a printer.

The SB 14 is a bridge for connecting the NB 13 to PCI devices and peripheral devices. The SB 14 is connected to the NB 13 via the PCI bus to which, for example, a network interface (I/F) unit is also connected.

The ASIC 16 is an integrated circuit (IC) for use in image processing having a hardware component for the image processing, and serves as a bridge that connects the AGP bus 15, the PCI bus, the HDD 18, and the MEM-C 17 to each other. The ASIC 16 is composed of a PCI target, an AGP master, an arbiter (ARB) constituting the core of the ASIC 16, a memory controller that controls the MEM-C 17, a plurality of direct memory access controllers (DMACs) that perform, for example, rotation of image data by using a hardware logic or the like, and a PCI unit that transfers data to and from the engine 60 via the PCI bus. A facsimile control unit (FCU) 30, a universal serial bus (USB) 40, and an Institute of Electrical and Electronics Engineers 1394 (IEEE 1394) interface 50 are connected to the ASIC 16 via the PCI bus. An operation display unit 20 is directly connected to the ASIC 16.

The MEM-C 17 is a local memory that is used as an image buffer for copy and a code buffer. The hard disk drive (HDD) 18 is a storage for storing therein image data, computer programs, font data, and forms.

The AGP bus 15 is a bus interface for a graphics accelerator card that has been proposed for accelerating graphics operations. The AGP bus 15 accelerates operations of the graphics accelerator card by directly accessing the MEM-P 12 with a high throughput.

The programs executed in the MFP of the present embodiment are provided by being recorded in a computer-readable recording medium such as a CD-ROM, a flexible disk (FD), a CD-R, or a digital versatile disc (DVD) as files in an installable or executable format.

The programs executed in the MFP of the present embodiment may alternatively be configured to be provided by being stored on a computer connected to a network such as the Internet and downloaded via the network. The programs executed in the MFP of the present embodiment may also be configured to be provided or distributed via a network such as the Internet. The programs of the present embodiment may also be configured to be provided by being preinstalled in a ROM or the like.

The programs executed in the MFP of the present embodiment are configured as modules including the units (accepting unit, image processing unit, display processing unit, registration unit, and update unit) described above, and as actual hardware, the CPU (processor) reads the programs from the above-mentioned storage medium and executes the programs, whereby the units are loaded into a main memory, and thus, the accepting unit, the image processing unit, the display processing unit, the registration unit, and the update unit are generated in the main memory.

In the above-described embodiment, the examples are described in which the image processing apparatus of the present invention has a copy function, a printer function, a scanner function, and a facsimile function. However, the present invention can be applied to any image processing apparatus having at least one function out of a copy function, a printer function, a scanner function, and a facsimile function.

According to the present invention, a function list screen displays initial value buttons for calling up an initial value function screen that accepts from a user an instruction to execute a function using initial values, and also displays registered value buttons for calling up a registered value function screen that accepts an instruction from the user to execute the function using registered values registered by the user. Thus, an advantageous effect is achieved that the user can execute the function using the registered values with the same simple operation as that for executing the function using the initial values.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image processing apparatus having a plurality of functions for image processing, the image processing apparatus comprising:
  a memory that stores therein a function table including
    function identification information for identifying a function,
    an initial value set in advance for the function,
    a registered value set for the function by a user, and
    display specification information that specifies whether to display a first registered value button on a common home screen and specifies not to display a second registered value button on the common home screen;
  a display that displays the common home screen to allow the user to select, from among the plurality of functions, a function to be executed by the image processing apparatus; and
  circuitry configured to
    accept a user selection of the function to be executed on the common home screen displayed on the display,
    cause the display to display, on the common home screen, an initial value button corresponding to the function with the initial value, and
    cause the display to display, on the common home screen, the first registered value button corresponding to the function with the registered value when the display specification information specifies that the first registered value button is to be displayed on the common home screen,
  wherein
    a first portion of the initial value button and a first portion of the first registered value button include a common image indicating that the initial value button and the first registered value button correspond to the same function,
    a second portion of the initial value button and a second portion of the first registered value button include different images, the second portion of the first registered value button including identification information of the first registered value button in the function table, when the accepted user selection is of the initial value button, the circuitry causes the display to display an initial value function screen on which the initial value for the function corresponding to the selected initial value button is set;

when the accepted user selection is of the first registered value button, the circuitry causes the display to display a registered value function screen on which the registered value for the function corresponding to the selected first registered value button is set;

when an instruction to call all registered values stored in the memory is received while the initial value function screen is displayed, the circuitry causes, based on the display specification information stored in the memory, the display to display a registered value list screen on which when the display specification information specifies that the first registered value button is to be displayed on the common home screen, the first registered value button for calling up the registered value function screen corresponding to the registered value and an icon displayed with the first registered value button indicating that the first registered value button is to be displayed on the common home screen are displayed, and the second registered value button for calling up a registered value function screen corresponding to another registered value is displayed;

when an execution instruction to execute the function selected by the user is accepted while the initial value function screen is displayed on the display, the circuitry executes the function using the initial value corresponding to the initial value function screen; and when the execution instruction is accepted while one of the registered value function screens is displayed on the display, the circuitry executes the function using the registered value corresponding to the displayed registered value function screen.

2. The image processing apparatus according to claim 1, wherein the first registered value button and the second registered value button are displayed in display modes different from each other.

3. The image processing apparatus according to claim 1, wherein the first registered value button and the second registered value button correspond to the same registered value and include the same information.

4. The image processing apparatus according to claim 1, wherein the circuitry is further configured to:
accept an input of a new registered value for a predetermined function; and
register, in response to the accepted input, the new registered value into the memory in a corresponding manner to the function identification information.

5. The image processing apparatus according to claim 1, wherein the circuitry is further configured to:
accept an input of a deletion instruction for deleting the registered value; and
delete, in response to the accepted input, the registered value stored in the memory according to the deletion instruction.

6. The image processing apparatus according to claim 1, wherein the memory further stores therein a name of the function, to which the registered value has been set, in a corresponding manner to the registered value; and
the circuitry is further configured to
accept an input of a new name for the function; and
register, in response to the accepted input, the new name into the memory in a corresponding manner to the registered value corresponding to the function.

7. The image processing apparatus according to claim 1, wherein
the memory further stores therein a display position of the initial value button on the common home screen in a corresponding manner to the initial value corresponding to the initial value button, and further stores therein a display position of the first registered value button in a corresponding manner to the registered value corresponding to the first registered value button; and
the circuitry is configured to arrange the initial value button and the first registered value button on the common home screen based on the display positions.

8. The image processing apparatus according to claim 7, wherein the circuitry is further configured to
accept an input of an instruction corresponding to changing the display position of the initial value button or the first registered value button on the common home screen; and
update, based on the accepted instruction, the display position corresponding to the initial value or the registered value in the memory.

9. The image processing apparatus according to claim 1, wherein the circuitry is configured to cause the display to display the common home screen on which a first area, a second area, and a blank area are arranged, the first area including the initial value button arranged therein, the second area including the first registered value button arranged therein, and the blank area being an area between the first area and the second area and including neither the initial value button nor the first registered value button arranged therein.

10. The image processing apparatus according to claim 1, wherein
the memory stores therein a plurality of the function tables for respective users, each of the tables corresponding to user identification information identifying a user; and
the circuitry is configured to cause the display to display the common home screen on which the initial value button corresponding to the initial value stored in the function table for a predetermined user and the first registered value button corresponding to the registered value stored in the function table for the predetermined user are arranged, and which includes a user image identifying the predetermined user.

11. The image processing apparatus according to claim 1, wherein
the initial value function screen that is displayed on the display when the selection of the initial value button is accepted includes the initial value button; and
the registered value function screen that is displayed on the display when the selection of the first registered value button is accepted includes the first registered value button.

12. An image processing method executed in an image processing apparatus having a plurality of functions for image processing, the image processing apparatus comprising a memory that stores therein a function table including function identification information for identifying a function, an initial value set in advance for the function, a registered value set for the function by a user, and display specification information that specifies whether to display a first registered value button on a common home screen and specifies not to display a second registered value button on the common home screen;

the image processing method comprising:

displaying, by a display, the common home screen to allow the user to select, from among the plurality of functions, a function to be executed by the image processing apparatus;

accepting, by an accepting unit, a selection of the function to be executed by the image processing apparatus on the common home screen displayed on the display;

causing, by a displaying processing unit, the display to display, on the common home screen, an initial value button corresponding to the function with the initial value;

causing the display to display, on the common home screen, the first registered value button corresponding to the function with the registered value when the display specification information specifies that the first registered value button is to be displayed on the common home screen, a first portion of the initial value button and a first portion of the first registered value button including a common image indicating that the initial value button and the first registered value button correspond to the same function, and a second portion of the initial value button and a second portion of the first registered value button including different images, the second portion of the first registered value button including identification information of the first registered value button in the function table;

when the accepting unit has accepted the selection of the initial value button, the display processing unit causing the display to display an initial value function screen on which the initial value for the function corresponding to the selected initial value button is set;

when the accepting unit has accepted the selection of the first registered value button, the display processing unit causing the display to display a registered value function screen on which the registered value for the function corresponding to the selected first registered value button is set;

causing, based on the display specification information stored in the memory, the display to display, when an instruction to call all registered values stored in the memory is received while the initial value function screen is displayed, a registered value list screen on which when the display specification information specifies that the first registered value button is to be displayed on the common home screen, the first registered value button for calling up the registered value function screen corresponding to the registered value and an icon displayed with the first registered value button indicating that the first registered value button is to be displayed on the common home screen are displayed, and the second registered value button for calling up a registered value function screen corresponding to another registered value is displayed;

executing, by an image processing unit, when an execution instruction to execute the function selected by the user is accepted while the initial value function screen is displayed on the display, the function using the initial value corresponding to the initial value function screen; and executing, when the execution instruction is accepted while one of the registered value function screens is displayed on the display, the function using the registered value corresponding to the displayed registered value function screen.

13. A computer program product comprising a non-transitory computer-readable medium including programmed instructions, wherein the instructions cause a computer, having a plurality of functions for image processing and comprising a memory that stores therein a function table including function identification information for identifying a function, an initial value set in advance for the function, a registered value set for the function by a user, and display specification information that specifies whether to display a first registered value button on a common home screen and specifies not to display a second registered value button on the common home screen, to execute a method comprising:

displaying, on a display, the common home screen to allow the user to select, from among the plurality of functions, a function to be executed by an image processing apparatus;

accepting a selection of the function to be executed by the image processing apparatus on the common home screen displayed on the display;

causing the display to display, on the common home screen, an initial value button corresponding to the function with the initial value;

causing the display to display, on the common home screen, the first registered value button corresponding to the function with the registered value when the display specification information specifies that the first registered value button is to be displayed on the common home screen, a first portion of the initial value button and a first portion of the first registered value button including a common image indicating that the initial value button and the first registered value button correspond to the same function, and a second portion of the initial value button and a second portion of the first registered value button including different images, the second portion of the first registered value button including identification information of the first registered value button in the function table;

when the selection of the initial value button is accepted, causing the display to display an initial value function screen on which the initial value for the function corresponding to the selected initial value button is set;

when the selection of the first registered value button is accepted, causing the display to display a registered value function screen on which the registered value for the function corresponding to the selected first registered value button is set;

causing, based on the display specification information stored in the memory, the display to display, when an instruction to call all registered values stored in the memory is received while the initial value function screen is displayed, a registered value list screen on which when the display specification information specifies that the first registered value button is to be displayed on the common home screen, the first registered value button for calling up the registered value function screen corresponding to the registered value and an icon displayed with the first registered value button indicating that the first registered value button is to be displayed on the common home screen are displayed, and the second registered value button for calling up a registered value function screen corresponding to another registered value is displayed;

executing, when an execution instruction to execute the function selected by the user is accepted while the initial value function screen is displayed on the display, the function using the initial value corresponding to the initial value function screen; and executing, when the execution instruction is accepted while one of the registered value function screens is displayed on the display, the function using the registered value corresponding to the displayed registered value function screen.

14. The image processing apparatus according to claim 1, wherein the icon displayed with the first registered value button includes a home image.

\* \* \* \* \*